US012673262B2

(12) United States Patent　　(10) Patent No.:　US 12,673,262 B2
Ding　　(45) Date of Patent:　Jul. 7, 2026

(54) VIRTUAL ITEM SHARING METHOD AND APPARATUS, DEVICE, AND COMPUTER-READABLE STORAGE MEDIUM

(71) Applicant: Tencent Technology (Shenzhen) Company Limited, Shenzhen (CN)

(72) Inventor: Dingqinquan Ding, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 225 days.

(21) Appl. No.: 18/747,295

(22) Filed: Jun. 18, 2024

(65) Prior Publication Data

US 2024/0335749 A1　　Oct. 10, 2024

Related U.S. Application Data

(63) Continuation of application No. PCT/CN2023/089599, filed on Apr. 20, 2023.

(30) Foreign Application Priority Data

May 20, 2022　(CN) .......................... 202210554391.6

(51) Int. Cl.
　*A63F 13/533*　　(2014.01)
　*A63F 13/55*　　(2014.01)
　*G06F 3/04842*　　(2022.01)
(52) U.S. Cl.
　CPC ............ *A63F 13/533* (2014.09); *A63F 13/55* (2014.09); *G06F 3/04842* (2013.01)
(58) Field of Classification Search
　None
　See application file for complete search history.

(56) References Cited

U.S. PATENT DOCUMENTS 8,888,598 B2 * 11/2014 Mehta ..................... A63F 13/12
　　　　　　　　　　　　　　463/42
2020/0346113 A1 * 11/2020 Sun ....................... A63F 13/837
2021/0178278 A1　6/2021 Qiu et al.

FOREIGN PATENT DOCUMENTS

CN　　111659119 A　　9/2020
CN　　114130028 A　　3/2022
　　　　　　(Continued)

OTHER PUBLICATIONS

Tencent Technology, ISR, PCT/CN2023/089599, Jun. 21, 023, 2 pgs.

(Continued)

*Primary Examiner* — Stephen T. Reed
(74) *Attorney, Agent, or Firm* — Morgan, Lewis & Bockius LLP

(57)　　　ABSTRACT

This application discloses a virtual item sharing method performed by a computer device. The method includes: displaying at least one configuration option corresponding to a first object and shared controls respectively corresponding to configuration options, one configuration option corresponding to at least one virtual backpack, each virtual backpack including at least one virtual item; in response to a shared control corresponding to a selection of a target configuration option in the at least one configuration option, setting at least one virtual backpack corresponding to the target configuration option as a shared virtual backpack provided by the first object; and sharing a virtual item in any shared virtual backpack provided by the first object with a second object belonging to a same virtual camp as the first object, and any shared virtual backpack provided by the first object including a virtual item not owned by the second object.

20 Claims, 17 Drawing Sheets

(56)        References Cited

FOREIGN PATENT DOCUMENTS

| CN | 114159788 | A  | 3/2022  |
|----|-----------|----|---------|
| JP | 2002315969 | A  | 10/2002 |
| JP | 5608928   | B1 | 10/2014 |

OTHER PUBLICATIONS

Tencent Technology, WO, PCT/CN2023/089599, Jun. 21, 2023, 3 pgs.

Tencent Technology, IPRP, PCT/CN2023/089599, Nov. 7, 2024, 4 pgs.

* cited by examiner

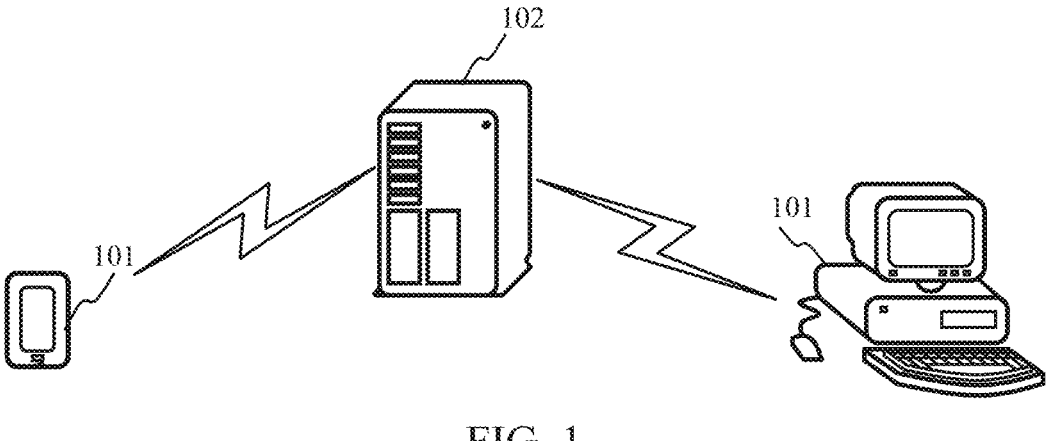

FIG. 1

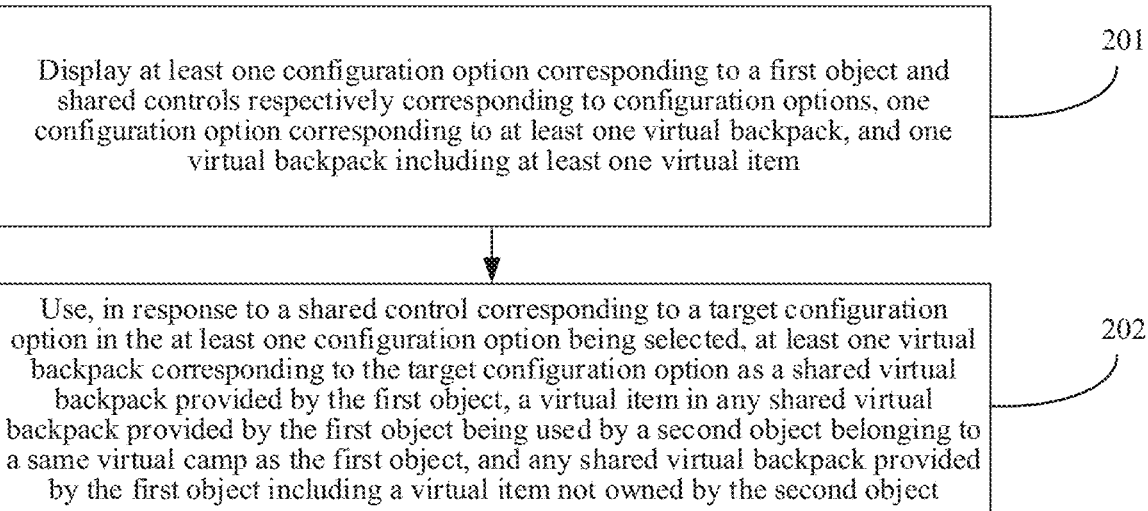

Display at least one configuration option corresponding to a first object and shared controls respectively corresponding to configuration options, one configuration option corresponding to at least one virtual backpack, and one virtual backpack including at least one virtual item    201

Use, in response to a shared control corresponding to a target configuration option in the at least one configuration option being selected, at least one virtual backpack corresponding to the target configuration option as a shared virtual backpack provided by the first object, a virtual item in any shared virtual backpack provided by the first object being used by a second object belonging to a same virtual camp as the first object, and any shared virtual backpack provided by the first object including a virtual item not owned by the second object    202

FIG. 2

VIRTUAL ITEM SHARING METHOD AND APPARATUS, DEVICE, AND COMPUTER-READABLE STORAGE MEDIUM

CROSS-REFERENCE TO RELATED APPLICATIONS

This application is a continuation application of PCT Patent Application No. PCT/CN2023/089599, entitled "VIRTUAL ITEM SHARING METHOD AND APPARATUS, DEVICE, AND COMPUTER-READABLE STORAGE MEDIUM" filed on Apr. 20, 2023, which claims priority to Chinese Patent Application No. 202210554391.6, entitled "VIRTUAL ITEM SHARING METHOD AND APPARATUS, DEVICE, AND COMPUTER-READABLE STORAGE MEDIUM" filed on May 20, 2022, both of which are incorporated by reference in their entirety.

FIELD OF THE TECHNOLOGY

Embodiments of this application relate to the field of computer technologies, and in particular, to a virtual item sharing method and apparatus, a device, and a computer-readable storage medium.

BACKGROUND OF THE DISCLOSURE

With the continuous development of computer technologies, online games with multiplayer online gameplay are favored by increasingly more users, such as multiplayer online battle arena (MOBA) games. In the online games with multiplayer online gameplay, sharing of virtual items is often involved.

In related art, a first object and a second object team up to play a game. The first object and the second object each already have a specific virtual item (for convenience of description, which is referred to as a "target virtual item"). However, the second object does not choose to use the target virtual item. In this case, the first object can share the target virtual item with the second object, so that the second object can use the target virtual item.

However, in the foregoing virtual item sharing method, only when the second object owns the target virtual item, the first object can share the target virtual item with the second object. This makes sharing of the target virtual item more limited and less flexible.

SUMMARY

Embodiments of this application provide a virtual item sharing method and apparatus, a device, and a computer-readable storage medium. The technical solutions are as follows.

According to an aspect of embodiments of this application, a virtual item sharing method is performed by a computer device. The method includes:

displaying at least one configuration option corresponding to a first object and shared controls respectively corresponding to configuration options, each configuration option corresponding to at least one virtual backpack, and each virtual backpack including at least one virtual item;

in response to a selection of a shared control corresponding to a target configuration option in the at least one configuration option, setting at least one virtual back-pack corresponding to the target configuration option as a shared virtual backpack provided by the first object; and sharing a virtual item in any shared virtual backpack provided by the first object with a second object belonging to a same virtual camp as the first object, and each shared virtual backpack provided by the first object comprising a virtual item not owned by the second object.

According to an aspect of embodiments of this application, a virtual item sharing method is provided, performed by a terminal device. The method includes:

displaying a grouping page corresponding to a target virtual interaction mode, a shared backpack control being displayed in the grouping page, and the shared backpack control being used by a first object to select a shared virtual backpack from shared virtual backpacks provided by any third object;

displaying a shared backpack selection page in response to the shared backpack control being selected, a shared virtual backpack provided by any third object and a virtual item in the shared virtual backpack provided by the third object being displayed in the shared backpack selection page; and using, in response to a first shared virtual backpack being selected, a virtual item in the first shared virtual backpack as a virtual item shared and used by the first object, the first shared virtual backpack being any shared virtual backpack provided by any third object, and the first shared virtual backpack including a virtual item not owned by the first object.

According to an aspect of embodiments of this application, a computer device is provided. The computer device includes a processor and a memory. The memory has a computer program stored therein, and the computer program is loaded and executed by the processor to cause the computer device to implement any one of the foregoing virtual item sharing methods.

According to an aspect of embodiments of this application, a non-transitory computer-readable storage medium is provided. The computer-readable storage medium has a computer program stored thereon, and the computer program is loaded and executed by a processor of a computer device to cause the computer device to implement any one of the foregoing virtual item sharing methods.

According to an aspect of embodiments of this application, a computer program product is provided. The computer program product includes a computer program, and the computer program is loaded and executed by a processor to implement any one of the foregoing virtual item sharing methods.

The technical solutions provided in embodiments of this application have the following beneficial effects.

In the technical solutions provided in embodiments of this application, the first object provides a shared virtual backpack to the second object belonging to the same virtual camp as the first object, so that the second object can use a virtual item in the shared virtual backpack. The second object only needs to belong to the same virtual camp as the first object, and is not limited to being an object that belongs to the same virtual camp as the first object and has a friend relationship with the first object, making sharing of the virtual item more flexible. Moreover, the virtual item in the virtual backpack provided by the first object for the second object includes an item not owned by the second object, so that the second object can experience, through the virtual item sharing manner, a virtual item that the second object is interested in but does not own, thereby diversifying a manner in which the second object obtains the virtual item.

BRIEF DESCRIPTION OF THE DRAWINGS

FIG. 1 is a schematic diagram of an implementation environment of a virtual item sharing method according to an embodiment of this application.

FIG. 2 is a flowchart of a virtual item sharing method according to an embodiment of this application.

DESCRIPTION OF EMBODIMENTS

Figure 3:
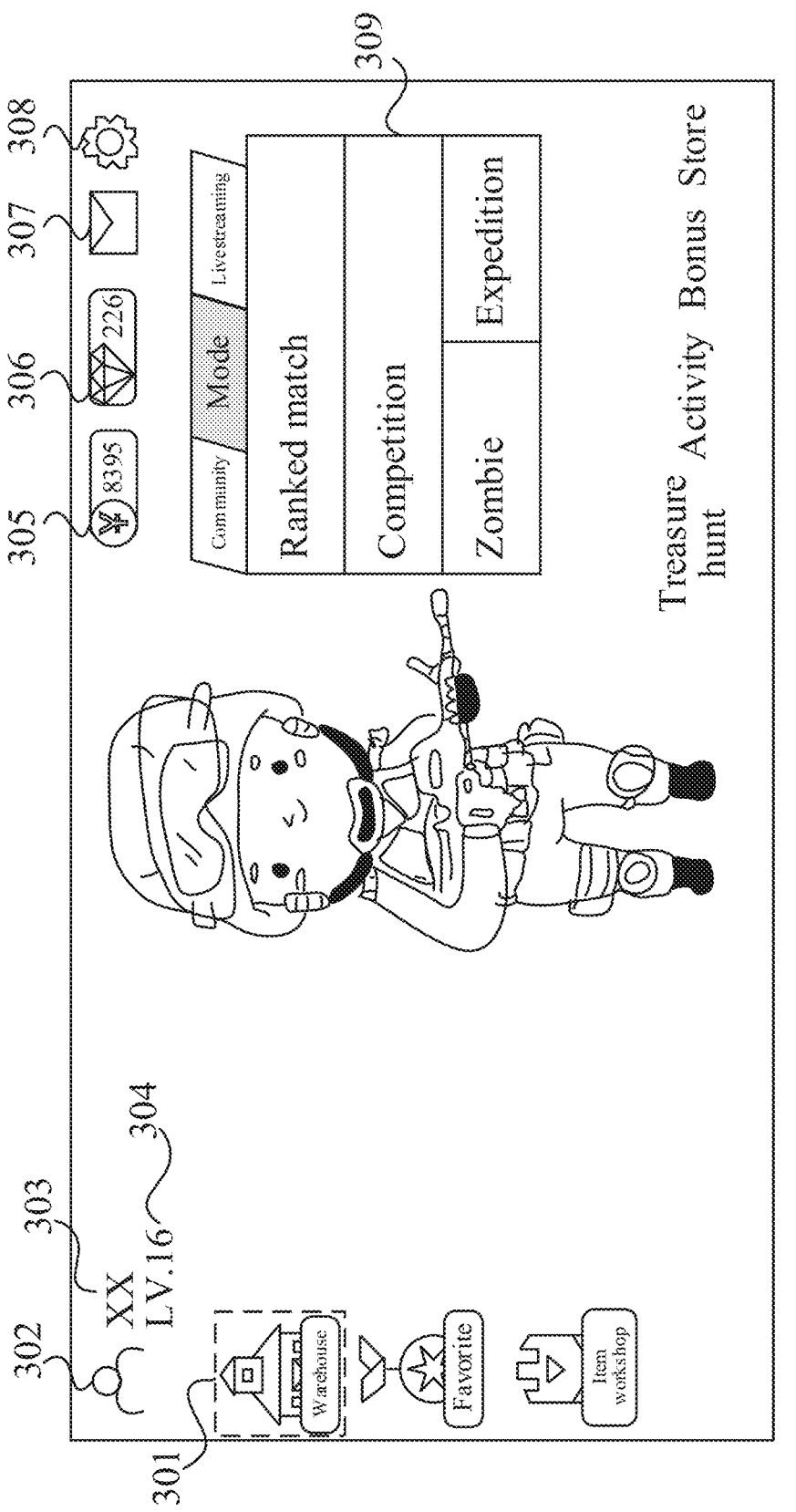
FIG. 3 is a schematic diagram of display of a first virtual scene according to an embodiment of this application.

To make the objectives, technical solutions, and advantages of this application clearer, the following further describes implementations of this application in detail with reference to the accompanying drawings.

For ease of understanding, terms involved in embodiments of this application are described first.

Shooting game: It is a game that uses a firearm for long-range attacks, and includes, but is not limited to, a first-person shooting game and a third-person shooting game. The firearm includes individual soldier items such as a rifle and pistol, artillery, a tank, an armored vehicle, and a rocket launcher.

Group: A plurality of players belong to the same virtual camp, and the players in the same virtual camp form a team. The players in the same virtual camp do not need to be friends.

Equip: A player customizes to choose to equip, including a main item, an auxiliary item, a projectile, and a series of content related to a game scene.

Equipment configuration scheme: It is an item configuration scheme that a player customizes to choose to equip into a virtual backpack. The content includes: a main item, an auxiliary item, a projectile, and the like. In a game, content of a virtual backpack is an equipment configuration scheme.

Configuration page: It is a collection of a group of equipment configuration schemes. In a game, one configuration page can include a plurality of equipment configuration schemes, in other words, one configuration page includes a plurality of virtual backpacks.

Virtual backpack: A player is allowed to customize to configure a virtual item that suits the player before playing a game, including a main item, an auxiliary item, a projectile, and the like.

Main item: A player can configure a shooting item in a virtual backpack, and the item is used by default after entering a game.

Auxiliary item: A player can configure a shooting item in a virtual backpack, and the item only can be used when switching is performed after entering a game.

Projectile: A player can configure a plurality of projectiles in a virtual backpack, and the projectiles only can be used when selection is performed after entering a game.

Virtual scene: It is a scene provided (or displayed) when an application is run on a terminal device. The virtual scene is a scene created for a virtual object to carry out an activity. The virtual scene may be a two-dimensional virtual scene, a two-and-a-half-dimensional virtual scene, a three-dimensional virtual scene, or the like. The virtual scene may be a simulation scene of the real world, a semi-simulation scene of the real world, or a purely fictional scene. For example, a virtual scene involved in embodiments of this application is a three-dimensional virtual scene.

Virtual object: It is a movable object in a virtual scene. The movable object may be a virtual character, a virtual animal, a cartoon character, and the like. A target object can manipulate the virtual object by using a peripheral component or by tapping a display screen. Each virtual object has a shape and volume in the virtual scene and occupies some space in the virtual scene. For example, when the virtual scene is the three-dimensional virtual scene, the virtual object is a three-dimensional model created based on a skeletal animation technology.

FIG. 1 is a schematic diagram of an implementation environment of a virtual item sharing method according to an embodiment of this application. As shown in FIG. 1, the implementation environment includes a terminal device 101 and a server 102.

An application that can provide a virtual scene is installed in and runs on the terminal device 101. The terminal device 101 is configured to perform the virtual item sharing methods provided in embodiments of this application.

A type of an application that can provide a virtual scene is not limited in embodiments of this application. For example, the application that can provide a virtual scene is a game application, for example, a third-person shooting (TPS) game, a first-person shooting (FPS) game, a multi-player online battle arena (MOBA) game, a multiplayer shooting survival game. In an exemplary embodiment, the game application involved in this embodiment of this application is a game application based on frame synchronization. In other words, the virtual item sharing method provided in this embodiment of this application can be applied to the game application based on frame synchronization.

Certainly, in addition to the game application, the application that can provide a virtual scene may alternatively be another type of application, such as a virtual reality (VR) application, an augmented reality (AR) application, a three-dimensional map program, a scene simulation program, a social application, or an interactive entertainment application.

The server 102 is configured to provide a background service for the application installed on the terminal device 101 that can provide a virtual scene. In a possible implementation, the server 102 is responsible for primary computing work, and the terminal device 101 is responsible for secondary computing work. Alternatively, the server 102 is responsible for secondary computing work, and the terminal device 101 is responsible for primary computing work. Alternatively, a distributed computing architecture may be used between the terminal device 101 and the server 102 for collaborative computing.

The terminal device 101 is any electronic product, such as a personal computer (PC), a mobile phone, a smart phone, a personal digital assistant (PDA), a wearable device, a pocket personal computer (Pocket PC), a tablet computer, a smart in-vehicle infotainment, a smart television, a smart speaker, that may interact with a user by using one or more manners such as a keyboard, a touch pad, a touch screen, a remote controller, a voice interaction, or a handwriting device. The server 102 may be a server, a server cluster including a plurality of servers, or a cloud computing service center. A communication connection is established between the terminal device 101 and the server 102 by using a wireless network or a wired network.

A person skilled in the art is to be understood that the foregoing terminal device 101 and the server 102 are merely examples for description, and that other existing or possible future terminal devices or servers, if applicable to this application, may also fall within the protection scope of this application and are incorporated herein by reference. The term "computer device" may refer to a terminal device or a server, a system comprising a terminal device or a server, or a system comprising both a terminal device and a server.

Based on the foregoing implementation environment, an embodiment of this application provides a virtual item sharing method. An example in which FIG. 2 is a flowchart of a virtual item sharing method according to an embodiment of this application is used. The method can be performed by the terminal device 101 in FIG. 1. As shown in FIG. 2, the method includes the following operations.

Operation 201: Display at least one configuration option corresponding to a first object and shared controls respectively corresponding to configuration options, one configuration option corresponding to at least one virtual backpack, and one virtual backpack including at least one virtual item.

In an exemplary embodiment of this application, a game application is installed in and runs on a terminal device. When a game is played in the game application, a virtual scene corresponding to the game can be displayed. The game application may be any type of application, which is not limited in this embodiment of this application. For example, the game application may be a first-person shooting application, or the game application may be a third-person shooting application.

Related information of the game application is displayed on a display interface of the terminal device. The related information of the game application may be an icon of the game application or a name of the game application, which is not limited in embodiments of this application. A first virtual scene is displayed in response to the related information of the game application being selected, and a virtual backpack configuration control is displayed in the first virtual scene. In one embodiment, the first virtual scene is a first picture displayed when the related information of the game application is selected. Certainly, the first virtual scene may alternatively be another game picture, which is not limited in embodiments of this application. The related information of the game application may be selected by single-clicking/tapping on the related information of the game application, by double-clicking/double-tapping the related information of the game application, or by voice, which is not limited in embodiments of this application. Other content may also be displayed in the first virtual scene, which is not limited in embodiments of this application. In one embodiment, object information of the first object may also be displayed in the first virtual scene. The object information includes at least one of an object's avatar, an object's name, an object's game level in the game, an object's resource value (a gold coin value) in the game, or an object's experience value in the game. A setting control and an information control may also be displayed in the first virtual scene. The setting control is configured to set the game, and the information control is configured to receive information sent by another object or a game system. Game-related information may also be displayed in the first virtual scene. The game-related information includes at least one of a game community, a virtual interaction mode, or game livestreaming.

FIG. 3 is a schematic diagram of display of a first virtual scene according to an embodiment of this application. In FIG. 3, a virtual backpack configuration control 301 is shown. In one embodiment, an object's avatar 302, an object's name 303, an object's game level in a game 304, an object's resource value in a game 305, an object's gold coin value in a game 306, an information control 307, a setting control 308, and the game-related information 309 are also shown in FIG. 3.

In a possible implementation, a virtual backpack configuration page is displayed in response to the virtual backpack configuration control being selected, and a configuration page management control is displayed in the virtual backpack configuration page. A configuration page management page is displayed in response to the configuration page management control being selected. At least one configuration option corresponding to a first object and shared controls respectively corresponding to configuration options are displayed in the configuration page management page. One configuration option corresponds to at least one virtual backpack, and one virtual backpack includes at least one virtual item.

A user can enter the virtual backpack configuration page to configure a virtual item before confirming starting a game.

In a possible implementation, a second virtual scene may be further displayed. When at least one virtual interaction mode is displayed in the second virtual scene, a grouping page corresponding to a target virtual interaction mode is displayed in response to the target virtual interaction mode in the at least one virtual interaction mode being selected. The virtual backpack configuration control is displayed in the grouping page. The target virtual interaction mode is any one of at least one virtual interaction mode. The virtual backpack configuration page is displayed in response to the virtual backpack configuration control being selected. The configuration page management control is displayed in the virtual backpack configuration page. A configuration page management page is displayed in response to the configuration page management control being selected. At least one configuration option corresponding to the first object and shared controls respectively corresponding to configuration options are displayed in the configuration page management page. In one embodiment, the second virtual scene and the first virtual scene may be the same or different, which is not limited in embodiments of this application. For example, the second virtual scene and the first virtual scene are the same. FIG. 3 is the schematic diagram of display of the first virtual scene, and also a schematic diagram of display of the second virtual scene. In FIG. 3, four virtual interaction modes are shown, namely a ranked match mode, a competitive mode, a zombie mode, and an expedition mode. The user can determine a virtual interaction mode of the game in the second virtual scene, enter the grouping page, and start preparing for the game in the grouping page. The foregoing provides two methods for setting up a shared virtual backpack, making a virtual item sharing manner more diverse.

In one embodiment, a retract control, a default configuration option corresponding to the first object, at least one virtual backpack corresponding to the default configuration option, and a virtual item in any virtual backpack corresponding to the default configuration option are further displayed in the virtual backpack configuration page. The retract control is configured to retract the virtual item in any virtual backpack in the default configuration option. The default configuration option corresponding to the first object is any one of the at least one configuration option corresponding to the first object, or the most frequently used configuration option in the at least one configuration option corresponding to the first object. The virtual item in any virtual backpack in the default configuration option may be a virtual item in any virtual backpack in the at least one virtual backpack in the default configuration option, or may be a virtual item in the most frequently used virtual backpack in the at least one virtual backpack in the default configuration option.

Figure 4:
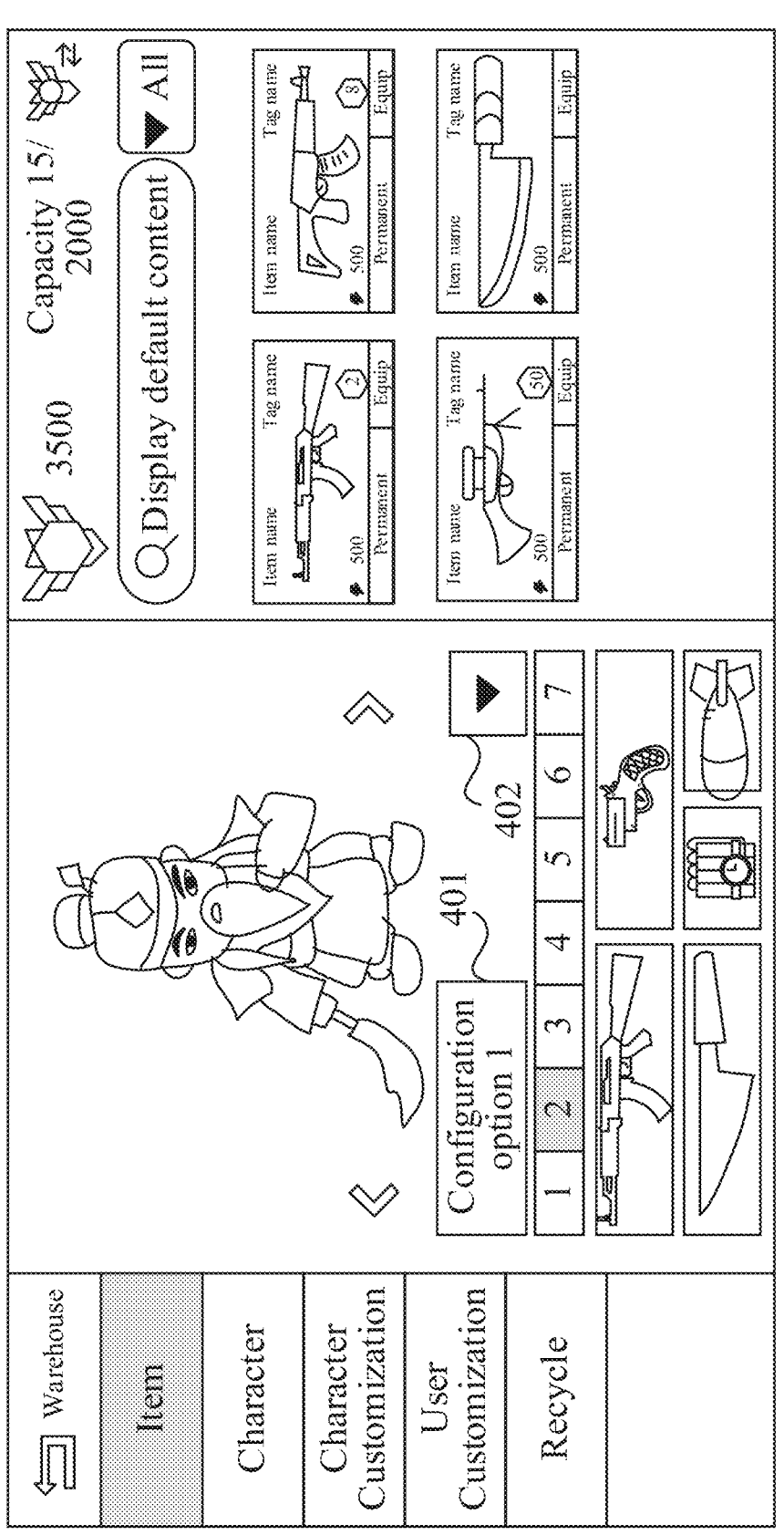
FIG. 4 is a schematic diagram of display of a virtual backpack configuration page according to an embodiment of this application.

FIG. 4 is a schematic diagram of display of a virtual backpack configuration page according to an embodiment of this application. In FIG. 4, a configuration page management control 401 and a retract control 402 are shown. It can be learned from FIG. 4 that a default configuration option corresponding to the first object is a configuration option 1. The configuration option 1 (the default configuration option) includes seven virtual backpacks. FIG. 4 shows five virtual items in a second virtual backpack in the configuration option 1 (the default configuration option). In one embodiment, there may be more or fewer virtual items in the second virtual backpack in the configuration option 1, which is not limited in this embodiment of this application.

For setting the default configuration option for the first object, the user can set a frequently used configuration scheme without a need of adjustments before each game.

In one embodiment, viewing controls respectively corresponding to configuration options are displayed in the configuration page management page. A first configuration page is displayed in response to a viewing control corresponding to a first configuration option being selected. At least one virtual backpack corresponding to the first configuration option and virtual items respectively included in virtual backpacks are displayed in the first configuration page. The first configuration option is any configuration option among a plurality of configuration options corresponding to the first object. Virtual items in different virtual backpacks may be the same or different, which is not limited in embodiments of this application.

Figure 5:
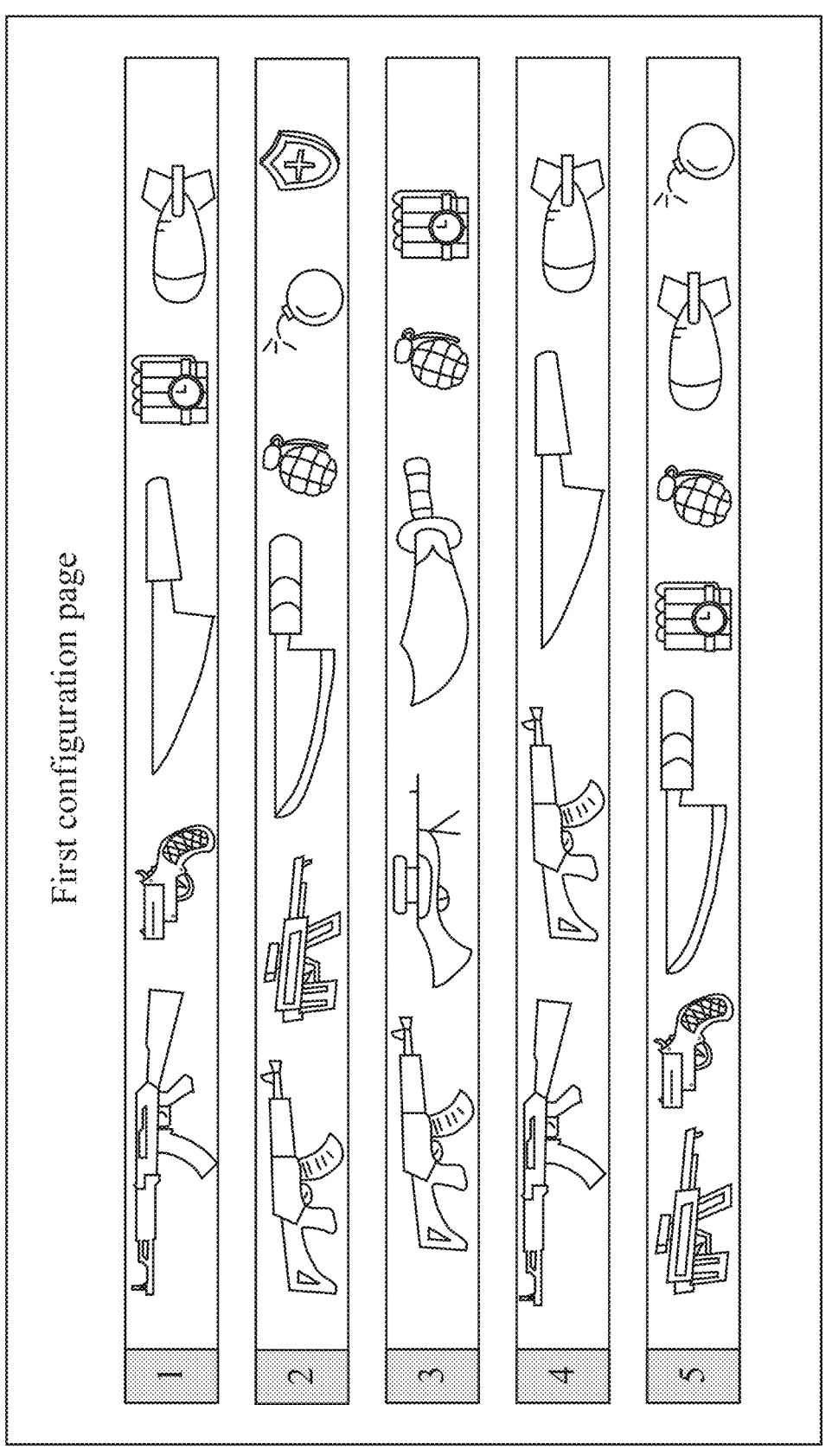
FIG. 5 is a schematic diagram of display of a first configuration page according to an embodiment of this application.

FIG. 5 is a schematic diagram of display of a first configuration page according to an embodiment of this application. FIG. 5 shows five virtual backpacks corresponding to a first configuration option, and virtual items respectively included in the virtual backpacks. The virtual items respectively included in the virtual backpacks corresponding to the first configuration option are shown in FIG. 5. Details are not described herein again.

In one embodiment, usage controls respectively corresponding to configuration options are displayed in the configuration page management page. Any one of at least one virtual backpack corresponding to the first configuration option is used, in response to a usage control corresponding to a first configuration option being selected, as a virtual backpack shared and used by the first object. The first object allows sharing and use of a virtual item in any virtual backpack. The usage control corresponding to the first configuration option is switched from an unselected state to a selected state in response to the usage control corresponding to the first configuration option being selected. The selected state means that the usage control corresponding to the first configuration option is displayed in a fifth display style. The unselected state means that the usage control corresponding to the first configuration option is displayed in a sixth display style. The fifth display style is different from the sixth display style. The specific fifth display style and sixth display style are not limited in this application. When the usage control corresponding to the first configuration option is in the selected state, any one of the at least one virtual backpack corresponding to the first configuration option is used as the virtual backpack shared and used by the first object. For example, the fifth display style is highlighted, and the sixth display style is unhighlighted. For another example, the fifth display style is box-selected, and the sixth display style is not box-selected.

In a possible implementation, in response to there being one virtual backpack corresponding to the first configuration option, the virtual backpack corresponding to the first configuration option is directly used as the virtual backpack shared and used by the first object. In response to that there being a plurality of virtual backpacks corresponding to the first configuration option, the most frequently used virtual backpack among the plurality of virtual backpacks corresponding to the first configuration option is used as the virtual backpack shared and used by the first object. Alternatively, any one of the plurality of virtual backpacks corresponding to the first configuration option is used as the virtual backpack shared and used by the first object.

Figure 6:
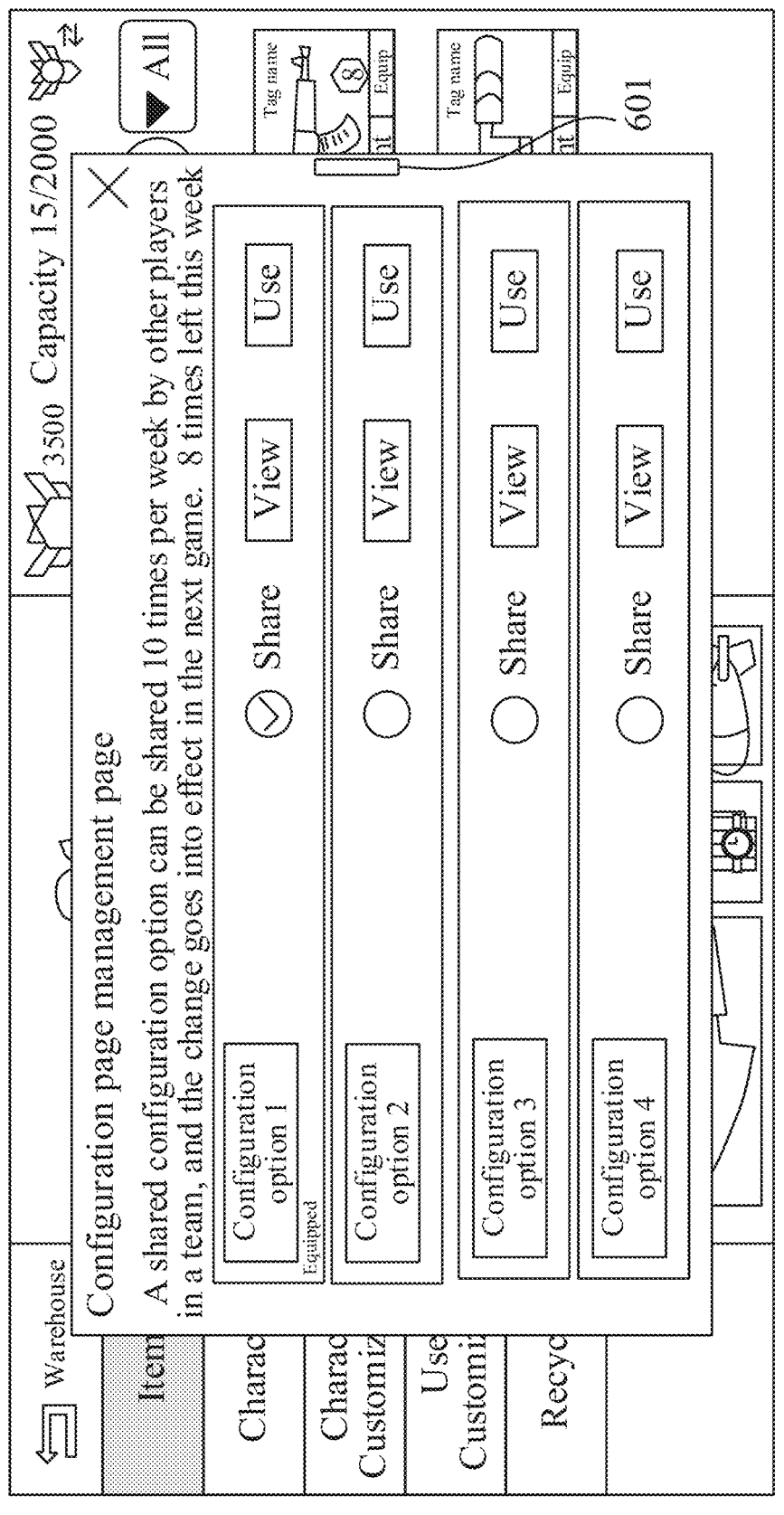
FIG. 6 is a schematic diagram of display of a configuration page management page according to an embodiment of this application.

FIG. 6 is a schematic diagram of display of a configuration page management page according to an embodiment of this application. Four configuration options (namely a configuration option 1, a configuration option 2, a configuration option 3, and a configuration option 4) corresponding to a first object, shared controls respectively corresponding to the configuration options, viewing controls respectively corresponding to the configuration options, and usage controls respectively corresponding to the configuration options are displayed in the configuration page management page. In one embodiment, when a quantity of configuration options corresponding to the first object is greater than 4, another configuration option corresponding to the first object may be further viewed by sliding a sliding control 601.

When the quantity of configuration options corresponding to the first object is 4, but a quantity of configuration options available to the first object is greater than 4, for example, when the quantity of configuration options available to the first object is 5, an acquisition control corresponding to a fifth configuration option may be further displayed in the configuration page management page. The first object acquires the fifth configuration option by selecting the acquisition control corresponding to the fifth configuration option, so that the quantity of the configuration options corresponding to the first object has changed from 4 to 5.

The user can view, in the configuration page management page, virtual backpacks respectively corresponding to the configuration options and virtual items respectively included in the virtual backpacks. The user can configure different virtual backpacks (virtual items in the virtual backpacks) in the configuration options in the configuration page management page to achieve different game strategies, experience different gameplay by switching the configuration options, and improve user experience.

In one embodiment, a process of the displaying, in response to a target virtual interaction mode in the at least one virtual interaction mode being selected, a grouping page corresponding to the target virtual interaction mode includes: displaying a game preparation page in response to the target virtual interaction mode in the at least one virtual interaction mode being selected, at least one virtual map and a start game control included in the target virtual interaction mode being displayed in the game preparation page; and displaying the grouping page in response to a target virtual map in the at least one virtual map being selected and the start game control being selected. In response to the target virtual map being selected and the start game control being selected, it indicates that the first object wants to play the game in the target virtual map. Therefore, it is necessary to determine a second object that plays the game in the target virtual map together with the first object.

Figure 7:
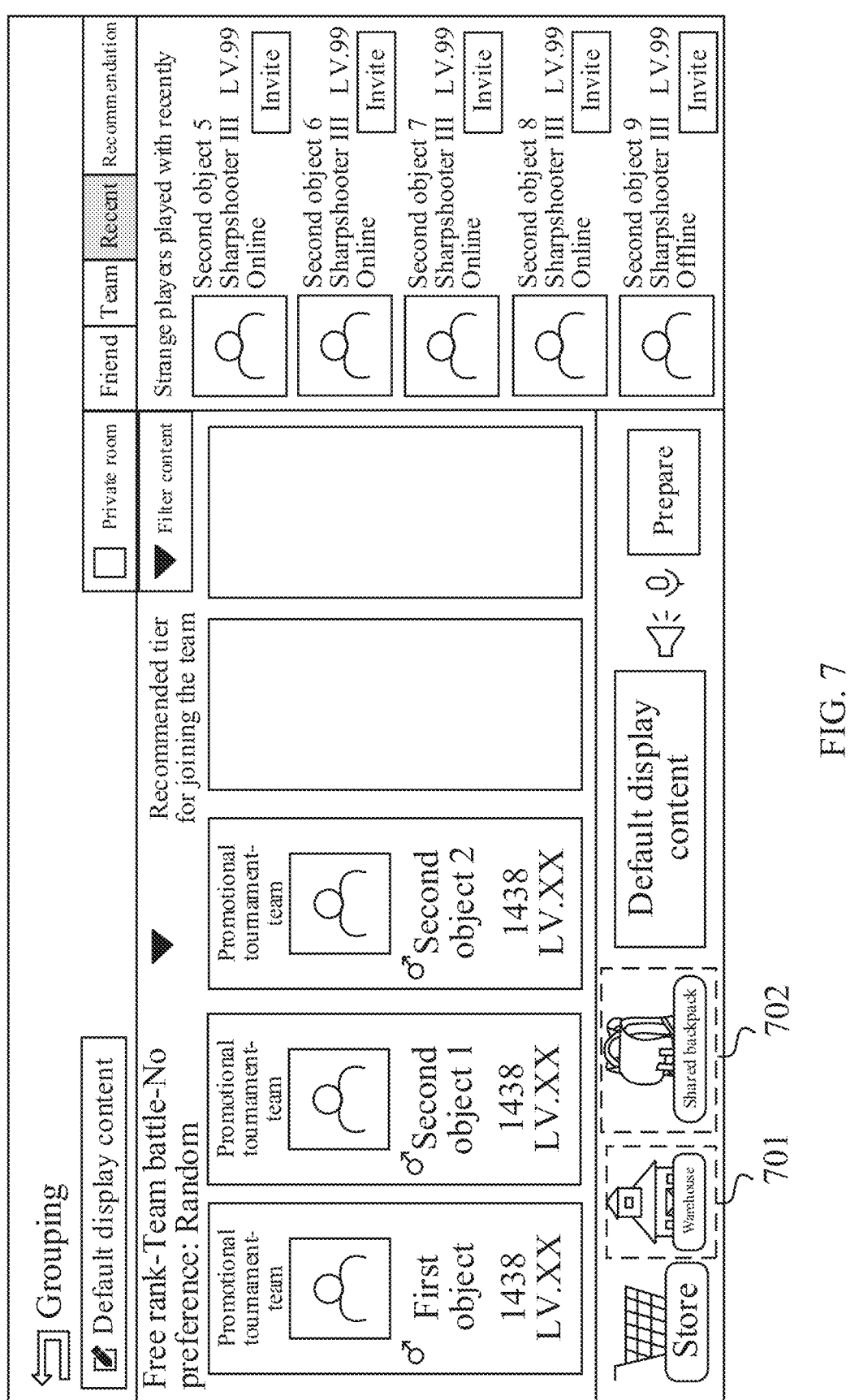
FIG. 7 is a schematic diagram of display of a grouping page according to an embodiment of this application.

FIG. 7 is a schematic diagram of display of a grouping page according to an embodiment of this application. A virtual backpack configuration control 701 is shown in FIG. 7. Object information of objects that have joined the team (where a first object, a second object 1, and a second object 2 in FIG. 7 are all objects that have joined the team) and object information of objects that the first object has played games with (where a second object 5, a second object 6, a second object 7, a second object 8, and a second object 9 are the objects that have played games with the first object recently) recently (within one week) are further displayed in the grouping page. Other content may also be displayed in the grouping page, which is not limited in this embodiment of this application.

In a possible implementation, an object corresponds to a maximum of eight configuration options, a configuration option corresponds to a maximum of seven virtual backpacks, and a virtual backpack includes at least one virtual item. In one embodiment, a virtual backpack includes four to seven virtual items. A virtual backpack includes a main item, an auxiliary item, a melee item, and one to four projectiles. For example, a virtual backpack includes four virtual items, namely a main item, an auxiliary item, a melee item, and a projectile.

In one embodiment, a virtual scene of an ongoing game is displayed on an interface of a terminal device in response to the first object having joined the game, in other words, when the first object is playing the game. A configuration page management control is displayed in the virtual scene. A configuration page management page is displayed in response to the configuration page management control being selected. At least one configuration option corresponding to the first object and shared controls respectively corresponding to configuration options are displayed in the configuration page management page.

Operation 202: Use, in response to a shared control corresponding to a target configuration option in the at least one configuration option being selected, at least one virtual backpack corresponding to the target configuration option as a shared virtual backpack provided by the first object, a virtual item in any shared virtual backpack provided by the first object being used by a second object belonging to a same virtual camp as the first object, and any shared virtual backpack provided by the first object including a virtual item not owned by the second object.

The target configuration option is any one of the at least one configuration option. Any shared virtual backpack provided by the first object includes the virtual item not owned by the second object. This means that the second object can use the virtual item not owned by the second object in the shared virtual backpack. However, the second object does not need to use the virtual item not owned by the second object. In other words, the second object is allowed to use the virtual item not owned by the second object in the shared virtual backpack, or the second object has permission to use the virtual item not owned by the second object in the shared virtual backpack.

The second object may be an object that belongs to the same virtual camp as the first object and has a friend relationship with the first object. The second object may alternatively be an object that belongs to the same virtual camp as the first object but has a non-friendship relationship with the first object, which is not limited in embodiments of this application. Provided that the second object and the first object belong to the same virtual camp. Any shared virtual backpack provided by the first object may include the virtual item not owned by the second object, or may include a virtual item owned by the second object, which is not limited in embodiments of this application. The second object may use the virtual item not owned by the second object in the shared virtual backpack, or may use the virtual item already owned by the second object in the shared virtual backpack.

The shared control corresponding to the target configuration option is switched from an unselected state to a selected state in response to the shared control corresponding to the target configuration option in the at least one configuration option being selected. The selected state means that the target configuration option is displayed in a first display style. The unselected state means that the target configuration option is displayed in a second display style. The first display style is different from the second display style. The specific first display style and second display style are not limited in this application. When the shared control corresponding to the target configuration option is in the selected state, the at least one virtual backpack corresponding to the target configuration option is used as the shared virtual backpack provided by the first object.

In the configuration page management page shown in FIG. 6, the shared control corresponding to the configuration option 1 is selected, and the shared control corresponding to the target configuration option is switched from the unselected state to the selected state. As shown in FIG. 6, a control with a check mark in a circle is selected, such as the configuration option 1. A control without a check mark in a circle is not selected, such as the configuration option 2. To be specific, at least one virtual backpack corresponding to the configuration option 1 is used as the shared virtual backpack provided by the first object, and then the second object can use a virtual item in any one of the at least one virtual backpack corresponding to the configuration option 1. In other words, the first object shares, with the second object, the virtual item in the shared virtual backpack provided by the first object.

In one embodiment, a shared backpack control is further displayed in the grouping page, and the shared backpack control is used by the first object to select a shared virtual backpack from shared virtual backpacks provided by any third object, so that the first object can use the shared virtual backpack provided by the third object. The third object may be an object that belongs to the same virtual camp as the first object, or it may be an object that does not belong to the same virtual camp as the first object, which is not limited in embodiments of this application. For example, a control 702 in FIG. 7 is a shared backpack control.

A shared backpack selection page is displayed in response to the shared backpack control being selected. A shared virtual backpack provided by any third object and a virtual item in the shared virtual backpack provided by the third object are displayed in the shared backpack selection page. A virtual item in a first shared virtual backpack is used, in response to the first shared virtual backpack being selected, as a virtual item shared and used by the first object. The first shared virtual backpack is any shared virtual backpack provided by any third object. The first shared virtual backpack is switched from an unselected state to a selected state in response to the first shared virtual backpack being selected. The selected state means that the first shared virtual backpack is displayed in a third display style. The unselected state means that the first shared virtual backpack is displayed in a fourth display style. The third display style is different from the fourth display style. The specific third display style and fourth display style are not limited in this application. When the first shared virtual backpack is in the selected state, at least one virtual item corresponding to the first shared virtual backpack is used as the virtual item shared and used by the first object.

In one embodiment, object information of the third object may also be displayed in the shared backpack selection page. The object information of the third object may be an object name of the third object or an object account of the third object, which is not limited in embodiments of this application. There may be one or more shared virtual backpacks provided by each third object, which is not limited in embodiments of this application. There may be one or more virtual items in the shared virtual backpack provided by each third object, which is not limited in embodiments of this application.

The shared backpack selection page may be an independent page or a page attached to the grouping page, which is not limited in embodiments of this application.

Figure 8:
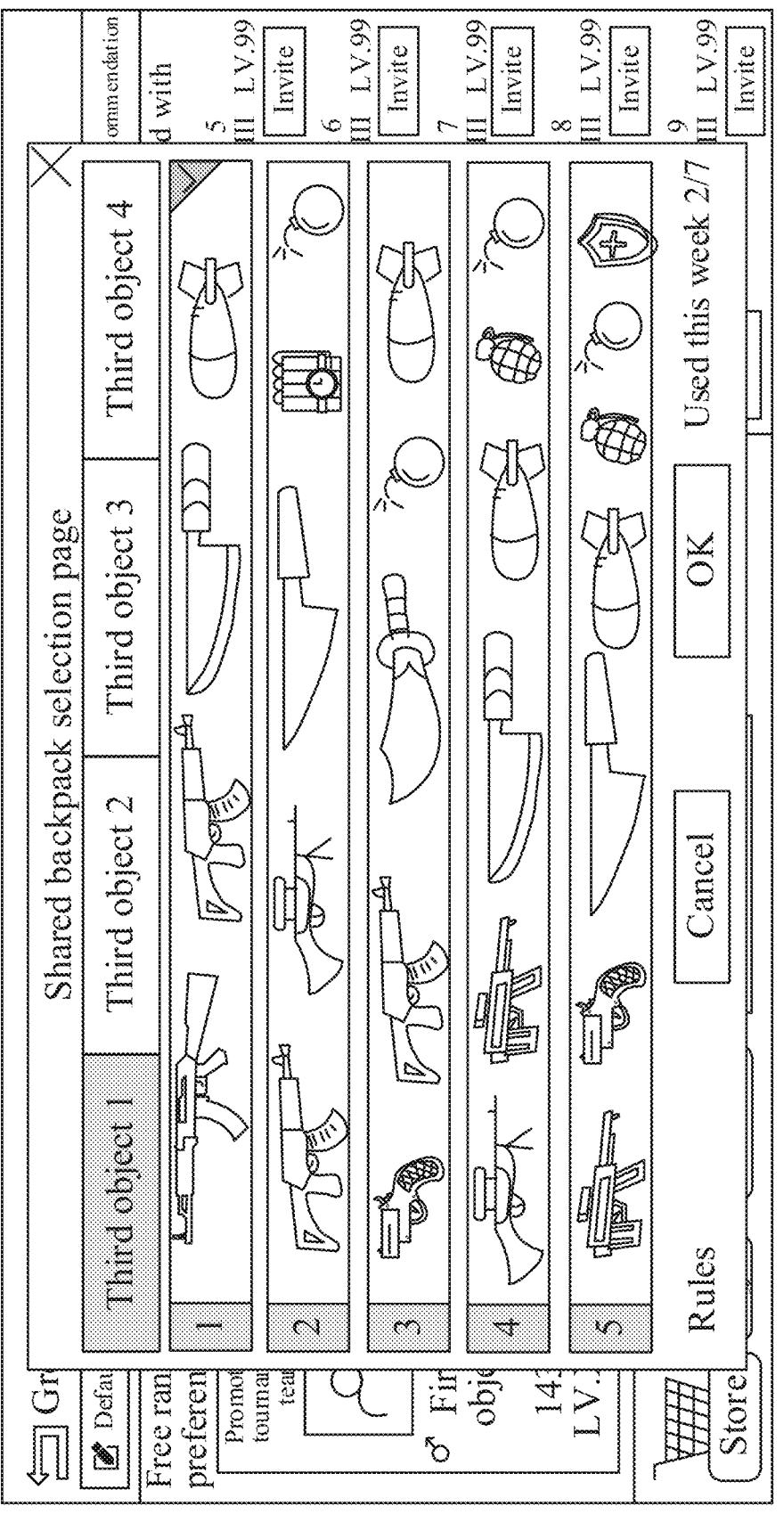
FIG. 8 is a schematic diagram of display of a shared backpack selection page according to an embodiment of this application.

FIG. 8 is a schematic diagram of display of a shared backpack selection page according to an embodiment of this application. In FIG. 8, the shared backpack selection page is a page attached to the grouping page. Object names of four third objects are displayed in the shared backpack selection page, namely a third object 1, a third object 2, a third object 3, and a third object 4. In addition, virtual items in shared virtual backpacks provided by the third objects are displayed. In FIG. 8, five shared virtual backpacks provided by the third object 1 are displayed. Virtual items respectively included in the shared virtual backpacks provided by the third object 1 are shown in FIG. 8. Details are not described herein again.

The virtual items in the shared virtual backpacks respectively provided by the third objects can be displayed at once in the shared backpack selection page. Only a virtual item in a shared virtual backpack provided by one third object may also be displayed in the shared backpack selection page. As shown in FIG. 8, the virtual items in the shared virtual backpacks provided by the third object 1 are displayed in the shared backpack selection page. When the third object 2 is selected, a shared virtual backpack provided by the third object 2 is highlighted, and a virtual item in the shared virtual backpack provided by the third object 2 are displayed in the shared backpack selection page. When the third object 3 is selected, a shared virtual backpack provided by the third object 3 is highlighted, and a virtual item in the shared virtual backpack provided by the third object 3 are displayed in the shared backpack selection page. When the third object 4 is selected, a shared virtual backpack provided by the third object 4 is highlighted, and a virtual item in the shared virtual backpack provided by the third object 4 are displayed in the shared backpack selection page.

Figure 9:
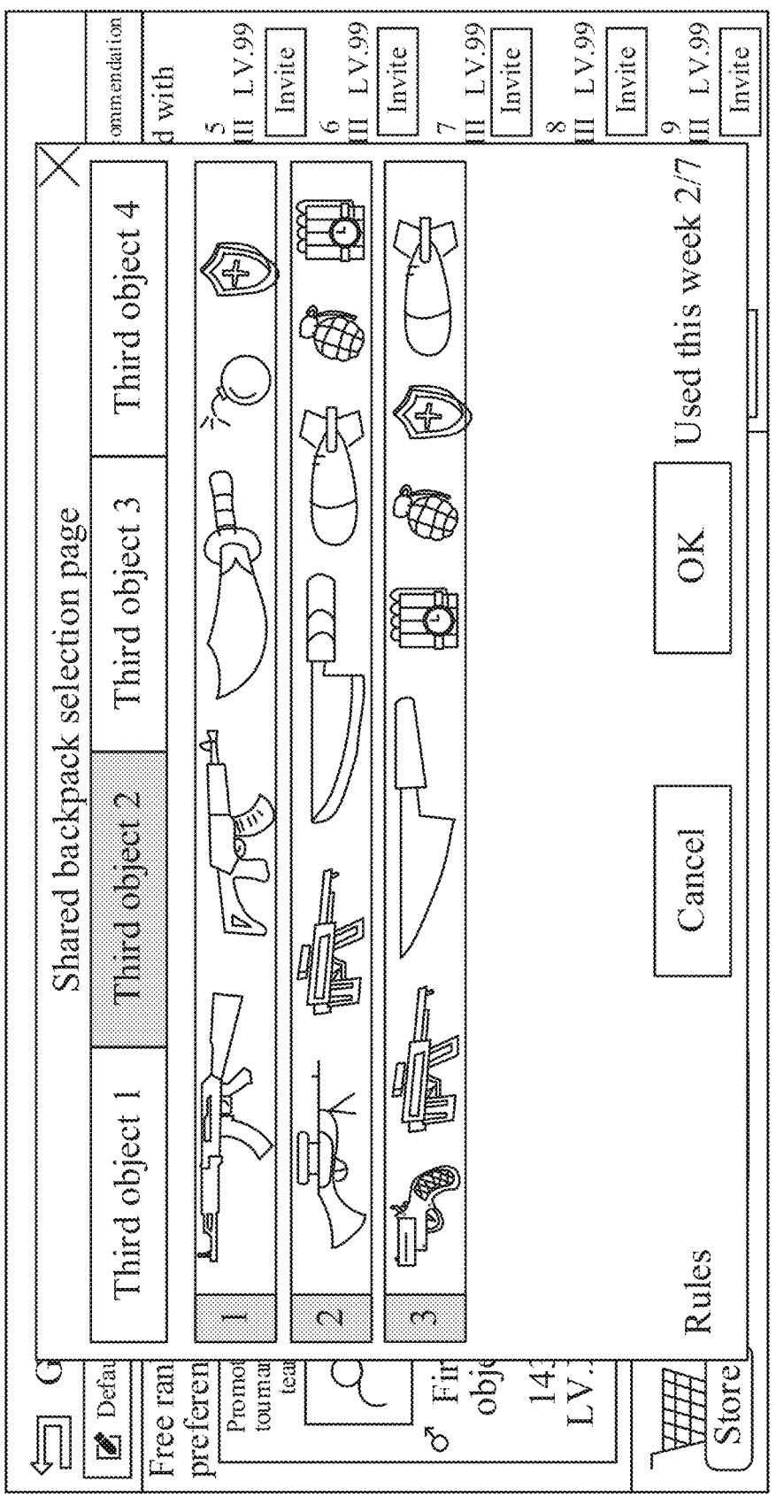
FIG. 9 is a schematic diagram of display of another shared backpack selection page according to an embodiment of this application.

FIG. 9 is a schematic diagram of display of another shared backpack selection page according to an embodiment of this application. As shown in FIG. 9, virtual items in shared virtual backpacks provided by the third object 2 are displayed in the shared backpack selection page. A quantity of shared virtual backpacks provided by the third object 2 is three. The virtual items in the shared virtual backpacks are shown in FIG. 9. Details are not described herein again.

In one embodiment, the first object can select the first shared virtual backpack in the shared backpack selection page, and use a virtual item in the first shared virtual backpack as the virtual item shared and used by the first object. In this way, the first object can use the virtual item in the first shared virtual backpack after joining a game. As shown in FIG. 8, the first shared virtual backpack selected by the first object in the shared backpack selection page is a first shared virtual backpack among the shared virtual backpacks provided by the third object 1. A virtual item in the first shared virtual backpack among the shared virtual backpacks provided by the third object 1 is used as the virtual item used by the first object. In this way, the first object can use, after joining the game, the virtual item in the first shared virtual backpack among the shared virtual backpacks provided by the third object 1.

The user can select a favorite shared virtual backpack in the shared backpack selection page, and use a virtual item in a selected first virtual backpack in the game. The third object that provides the first virtual backpack only needs to be in the same camp as a virtual object corresponding to the user. In addition, the first virtual backpack may have a virtual item not owned by the user, so that sharing of the virtual item is more flexible.

In a possible implementation, the first object selects the first shared virtual backpack in the shared backpack selection page. After the first object and at least one second object are both prepared, in other words, the first object and the at least one second object both select a preparation control in the grouping page, a virtual backpack adjustment page is displayed. The virtual item in the first shared virtual backpack and a virtual backpack replacement control are displayed in the virtual backpack adjustment page. The virtual backpack replacement control is configured to replace the shared virtual backpack provided by the third object and selected by the first object.

Figure 10:
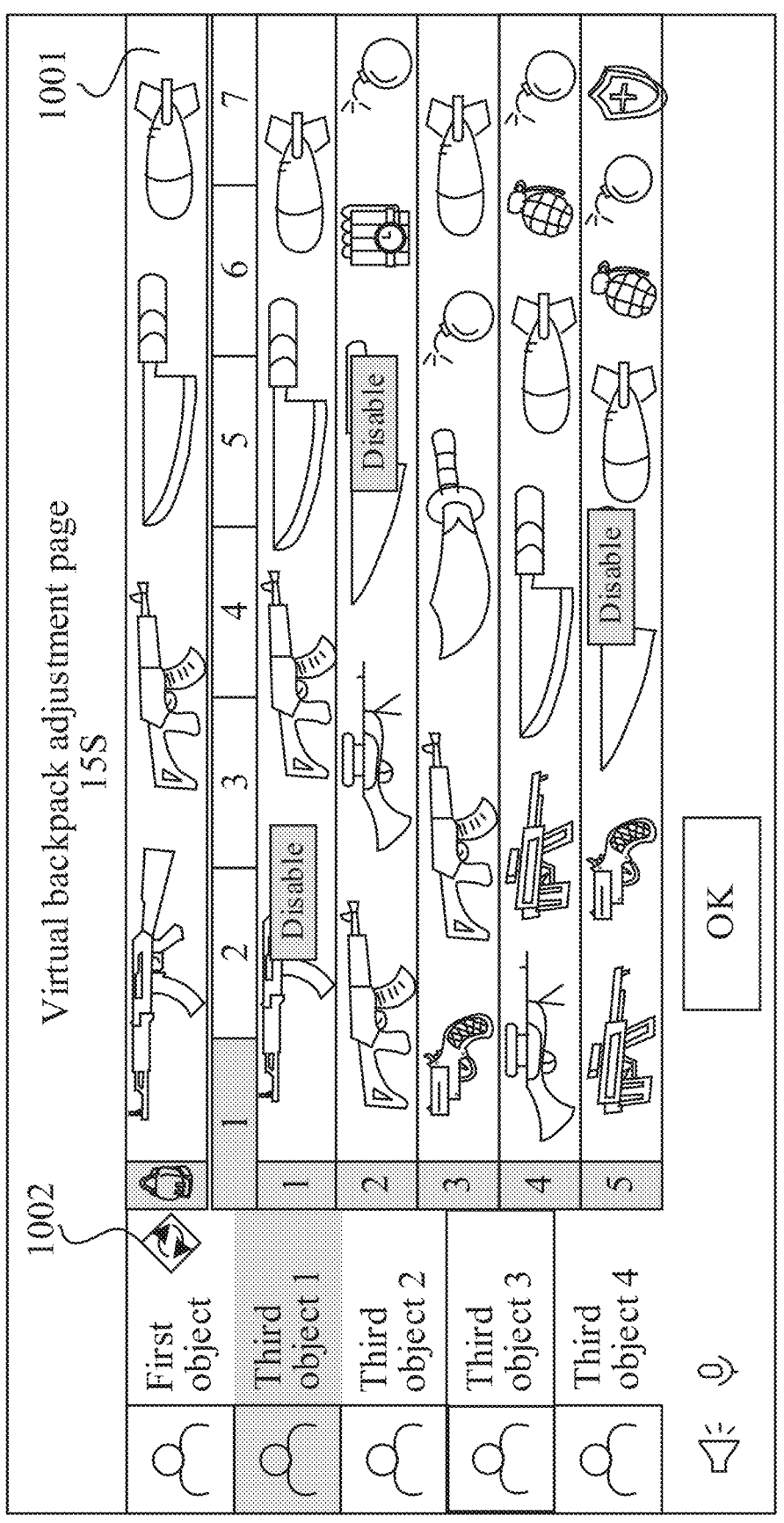
FIG. 10 is a schematic diagram of display of a virtual backpack adjustment page according to an embodiment of this application.

The shared backpack selection page is displayed in response to the virtual backpack replacement control being selected. There is a disabled virtual item in a shared virtual backpack provided by any third object in the shared backpack selection page, and the disabled virtual item cannot be used. FIG. 10 is a schematic diagram of display of a virtual backpack adjustment page according to an embodiment of this application. In FIG. 10, a virtual item 1001 in a first shared virtual backpack and a virtual backpack replacement control 1002 are shown. In one embodiment, a virtual item in a virtual backpack corresponding to any configuration option corresponding to any object can also be displayed in the virtual backpack adjustment page. There is a disabled virtual item among virtual items in the virtual backpack corresponding to any configuration option corresponding to any object. As shown in FIG. 10, virtual items respectively included in five virtual backpacks corresponding to a first configuration option corresponding to a third object 1 are also displayed. A first virtual item in a first virtual backpack corresponding to the first configuration option corresponding to the third object 1 is a disabled virtual item. A third virtual item in a second virtual backpack corresponding to the first configuration option corresponding to the third object 1 is a disabled virtual item. A third virtual item in a fifth virtual backpack corresponding to the first configuration option corresponding to the third object 1 is a disabled virtual item.

Figure 11:
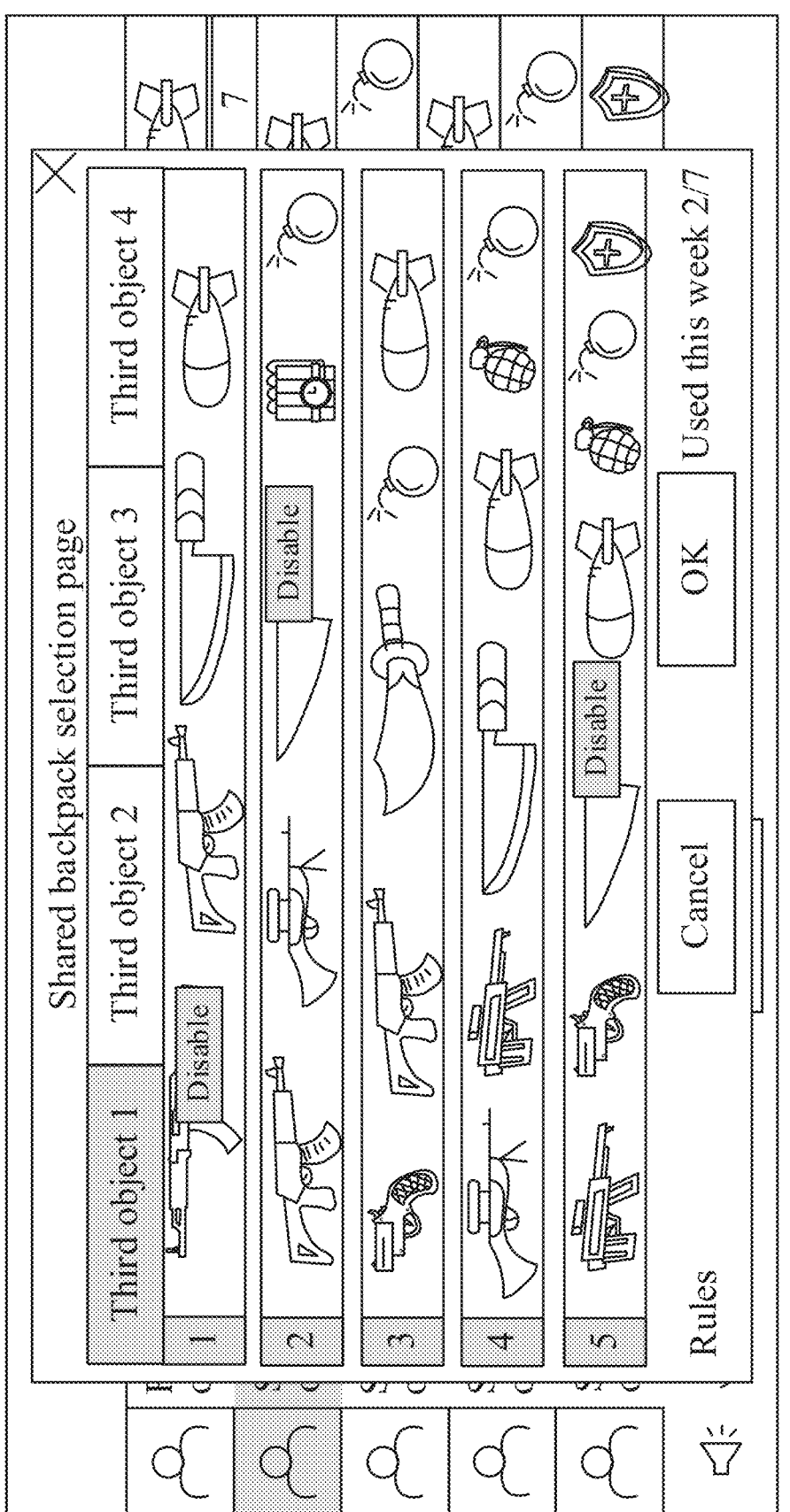
FIG. 11 is a schematic diagram of display of another shared backpack selection page according to an embodiment of this application.

FIG. 11 is a schematic diagram of display of another shared backpack selection page according to an embodiment of this application. In FIG. 11, a first virtual item in a first shared virtual backpack provided by a third object 1 is a disabled virtual item. A third virtual item in a second shared virtual backpack provided by the third object 1 is a disabled virtual item. A third virtual item in a fifth shared virtual backpack provided by the third object 1 is a disabled virtual item.

A virtual item of the first object is switched from a virtual item in the first shared virtual backpack to a virtual item in a second shared virtual backpack in response to the second shared virtual backpack being selected. The second shared virtual backpack is any shared virtual backpack other than the first shared virtual backpack among the shared virtual backpacks provided by any third object. In this way, the first object can use the virtual item in the second shared virtual backpack after joining a game. The first object cannot use a first virtual item in response to there being a disabled first virtual item among virtual items in the second shared virtual backpack. For example, a second virtual backpack is a third shared virtual backpack provided by the third object 1, to be specific, the first object can use, after joining the game, a virtual item in the third shared virtual backpack provided by the third object 1. For another example, if the second virtual backpack is a first shared virtual backpack provided by the third object 1, the first object can use, after joining the game, a non-disabled virtual item in the first shared virtual backpack provided by the third object 1. In other words, the first object can use, after joining the game, a second virtual item, a third virtual item, a fourth virtual item, a fifth virtual item, and a sixth virtual item in the first shared virtual backpack provided by the third object 1. A user can freely select a shared virtual backpack in the virtual backpack adjustment page, and then select a virtual item used in the game. The gameplay is more flexible and user experience is improved.

Based on the first object not selecting the first shared virtual backpack in the shared backpack selection page, after the first object and the at least one second object are both prepared, in other words, the first object and the at least one second object both select a preparation control in a grouping page, the virtual backpack adjustment page is displayed. A target control is displayed in the virtual backpack adjustment page. The target control is used by the first object to select a shared virtual backpack from the shared virtual backpacks provided by any third object, so that the first object can use a virtual item in the selected shared virtual backpack after joining the game. The shared backpack selection page is displayed in response to the target control being selected. A virtual item in a fourth shared virtual backpack is used, in response to the fourth shared virtual backpack being selected, as the virtual item shared and used by the first object. The fourth shared virtual backpack is any shared virtual backpack provided by any third object. The fourth shared virtual backpack is switched from an unselected state to a selected state in response to the fourth shared virtual backpack being selected. The selected state means that the fourth shared virtual backpack is displayed in a seventh display style. The unselected state means that the fourth shared virtual backpack is displayed in an eighth display style. The seventh display style is different from the eighth display style. The specific seventh display style and eighth display style are not limited in this application. When the fourth shared virtual backpack is in the selected state, at least one virtual item corresponding to the fourth shared virtual backpack is used as the virtual item shared and used by the first object. The first object cannot use a second virtual item in response to there being a disabled second virtual item among virtual items in the fourth shared virtual backpack.

Figure 12:
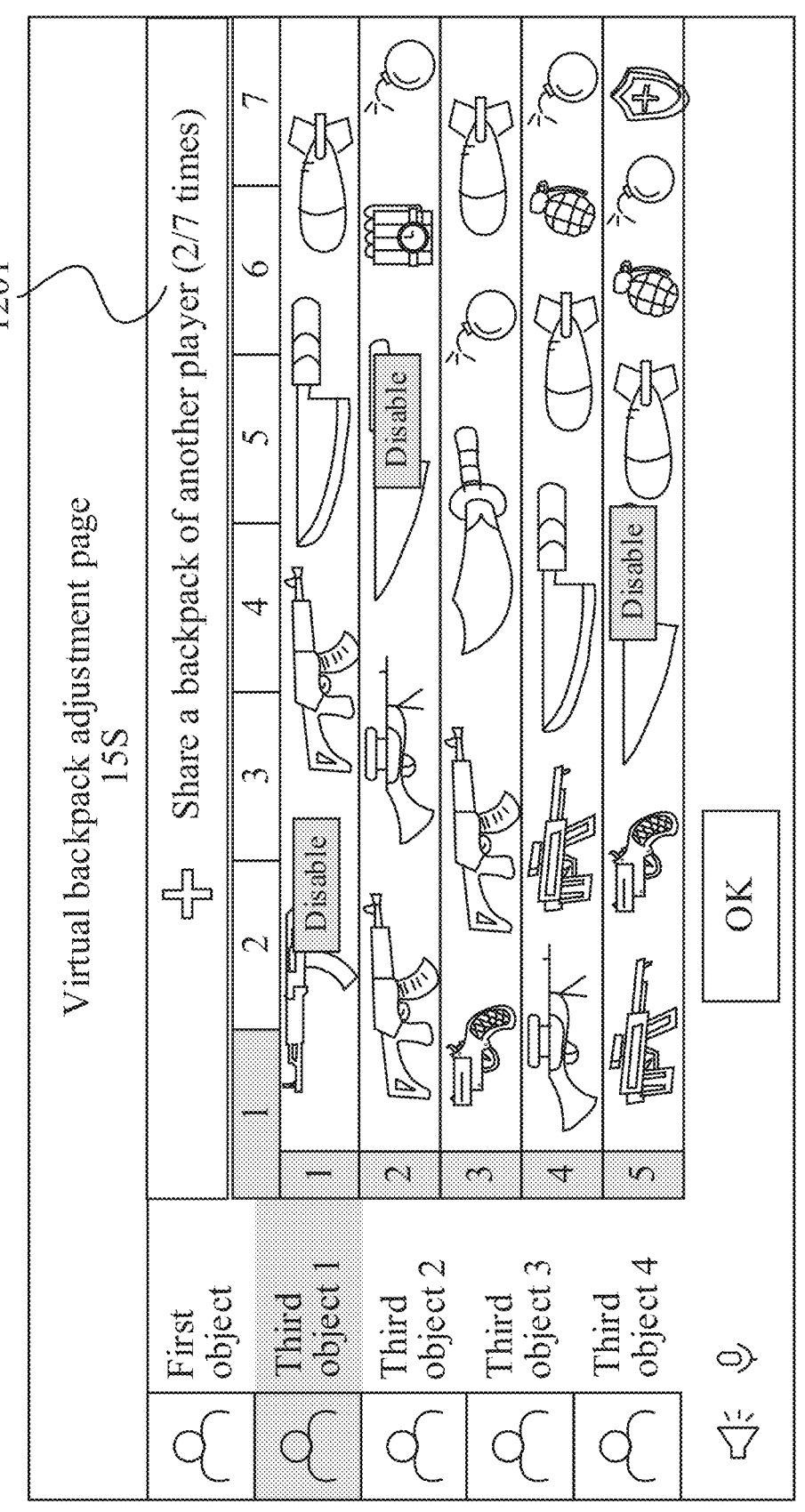
FIG. 12 is a schematic diagram of display of another virtual backpack adjustment page according to an embodiment of this application.

FIG. 12 is a schematic diagram of display of another virtual backpack adjustment page according to an embodiment of this application. In FIG. 12, a target control 1201 is shown. In one embodiment, a virtual item in a virtual backpack corresponding to any configuration option corresponding to any object can also be displayed in the virtual backpack adjustment page. There is a disabled virtual item among virtual items in the virtual backpack corresponding to any configuration option corresponding to any object. As shown in FIG. 12, virtual items respectively included in five virtual backpacks corresponding to a first configuration option corresponding to a third object 1 are also displayed. A first virtual item in a first virtual backpack corresponding to the first configuration option corresponding to the third object 1 is a disabled virtual item. A third virtual item in a second virtual backpack corresponding to the first configuration option corresponding to the third object 1 is a disabled virtual item. A third virtual item in a fifth virtual backpack corresponding to the first configuration option corresponding to the third object 1 is a disabled virtual item.

In a possible implementation, after the first object selects a shared virtual backpack from the shared virtual backpacks provided by any third object displayed in the shared backpack selection page, the first object joins a game, and a third virtual scene is displayed. A switching control is displayed in the third virtual scene. A virtual item used by the first object in the third virtual scene is a virtual item in a target shared virtual backpack. The target shared virtual backpack is any shared virtual backpack provided by any third object and selected by the first object. The switching control is configured to switch the virtual item shared and used by the first object. A virtual backpack switching page is displayed in response to the switching control being selected. The virtual item in the target shared virtual backpack and a virtual item in a virtual backpack corresponding to the first object are displayed in the virtual backpack switching page. The virtual item of the first object is switched from the virtual item in the target shared virtual backpack to a virtual item in a third virtual backpack in response to the third virtual backpack being selected. The third virtual backpack is any one of virtual backpacks corresponding to the first object. The virtual backpack switching page may be an independent page or a page attached to the third virtual scene, which is not limited in embodiments of this application.

Figure 13:
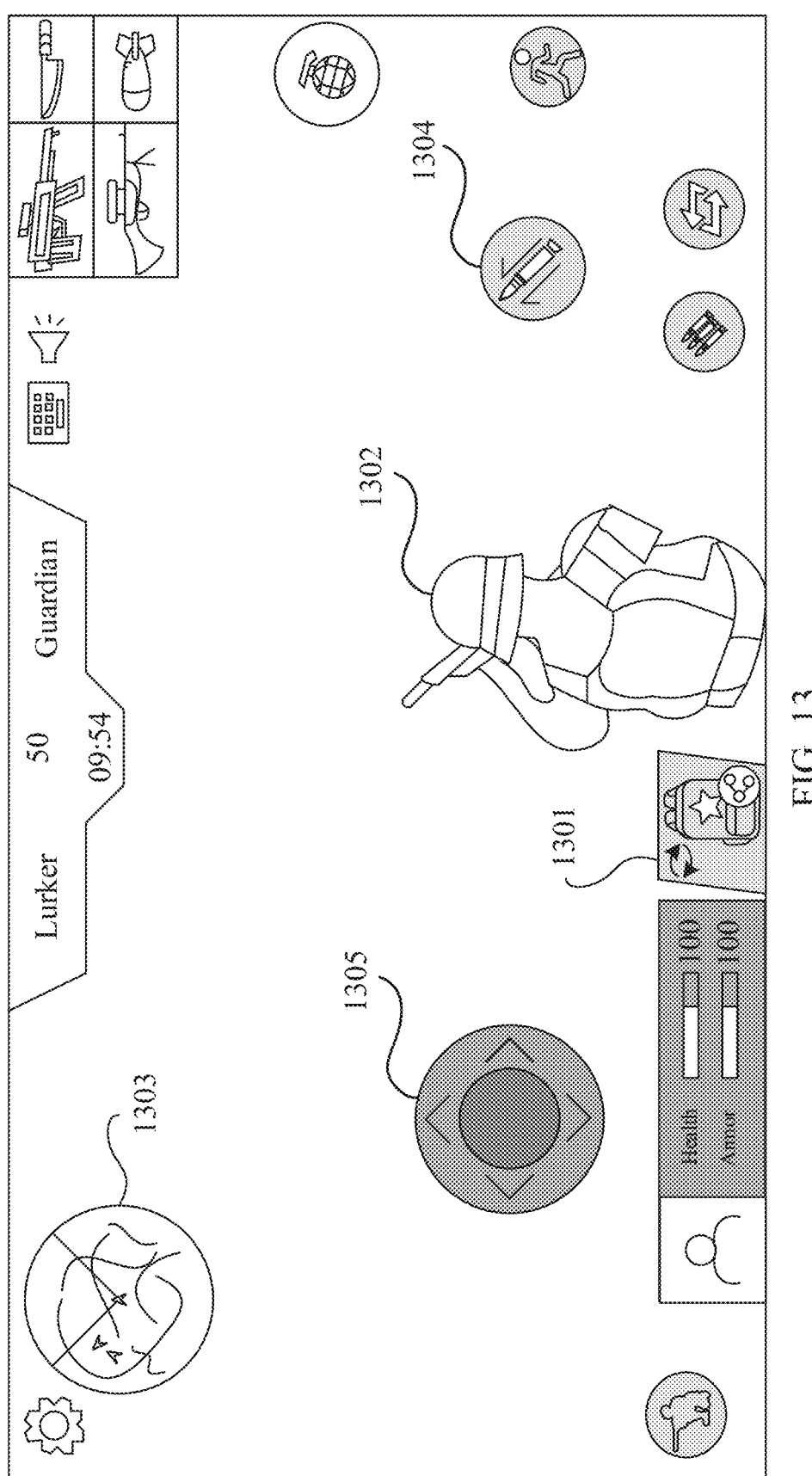
FIG. 13 is a schematic diagram of display of a third virtual scene according to an embodiment of this application.

FIG. 13 is a schematic diagram of display of a third virtual scene according to an embodiment of this application. A switching control 1301 is shown in FIG. 13. Other content may also be displayed in the third virtual scene, which is not limited in embodiments of this application. For example, a virtual object 1302 controlled by a first object, a virtual map 1303, a launch control 1304, and a movement control 1305 are also displayed in the third virtual scene.

Figure 14:
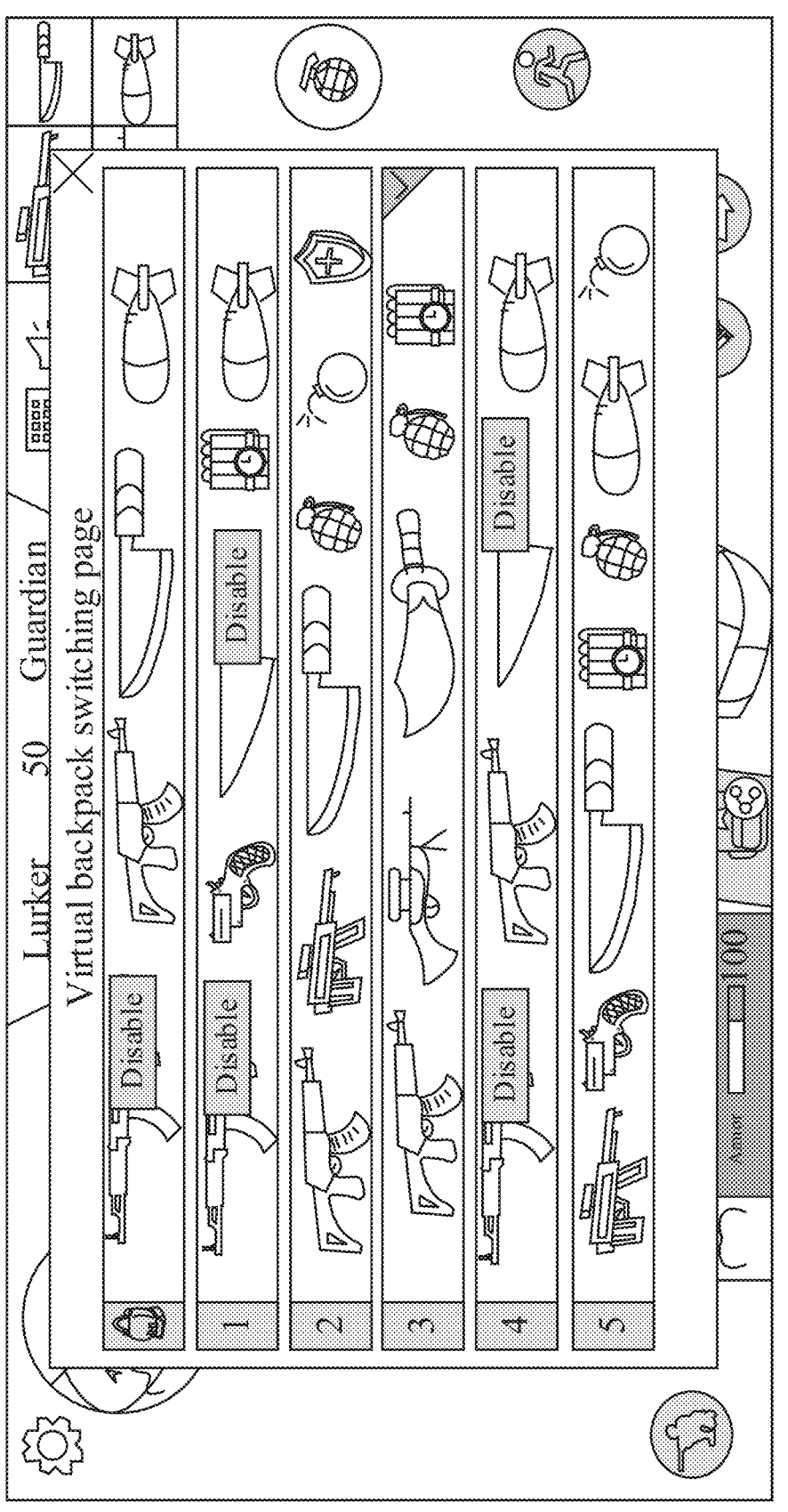
FIG. 14 is a schematic diagram of display of a virtual backpack switching page according to an embodiment of this application.

FIG. 14 is a schematic diagram of display of a virtual backpack switching page according to an embodiment of this application. The virtual backpack switching page shown in FIG. 14 is a page attached to a third virtual scene. A first virtual backpack displayed in the virtual backpack switching page is a target shared virtual backpack. A second virtual backpack to a sixth virtual backpack are all virtual backpacks corresponding to a first object.

In one embodiment, the first object can select any virtual backpack in the virtual backpack switching page. When the first object selects the third virtual backpack in the virtual backpack switching page, it means that the first object wants to use a virtual item in the third virtual backpack. Therefore, a virtual item of the first object is switched to the virtual item in the third virtual backpack, so that the first object can use the virtual item in the third virtual backpack. For example, a selected virtual backpack in FIG. 14 is the fourth virtual backpack. Therefore, the fourth virtual backpack is used as the third virtual backpack, and the virtual item of the first object is switched to a virtual item of the fourth virtual backpack, so that the first object can use the virtual item in the fourth virtual backpack.

The user can select a virtual item used by a virtual object from different virtual backpacks through a switching control during a game. The user can experience, through the virtual item sharing manner, a virtual item that the user is interested in but does not own, thereby improving interactive experience of the user in virtual interaction.

In the foregoing method, the first object provides a shared virtual backpack to the second object belonging to the same virtual camp as the first object, so that the second object can use a virtual item in the shared virtual backpack. The second object only needs to belong to the same virtual camp as the first object, and is not limited to being an object that belongs to the same virtual camp as the first object and has a friend relationship with the first object, making sharing of the virtual item more flexible. Moreover, the virtual item in the virtual backpack provided by the first object to the second object includes an item not owned by the second object, so that the second object can experience, through the virtual item sharing manner, a virtual item that the second object is interested in but does not own, thereby diversifying a manner in which the second object obtains the virtual item, and improving interactive experience of the second object in virtual interaction.

In addition, the first object can also use a shared virtual backpack provided by a third object that provides a shared virtual backpack, so that the first object can also experience a virtual item that the first object is interested in but does not own, thereby improving interactive experience of the first object in.

Figure 15:
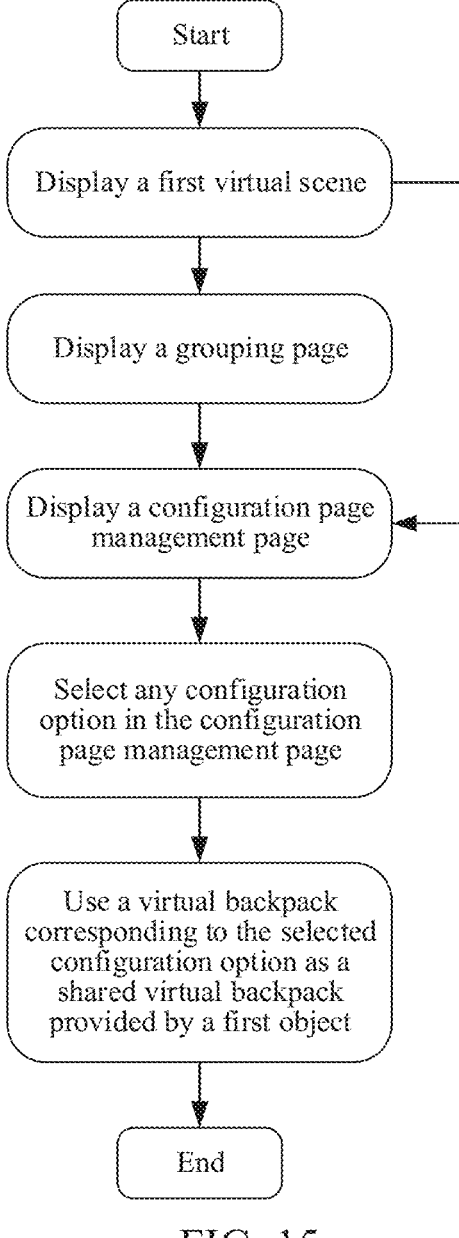
FIG. 15 is a flowchart of a virtual item sharing method according to an embodiment of this application.

FIG. 15 is a flowchart of a virtual item sharing method according to an embodiment of this application. FIG. 15 is a process in which a first object provides a shared virtual backpack to a second object belonging to the same virtual camp as the first object, so that the second object can use a virtual item of the first object. The method includes:

displaying a first virtual scene, a virtual backpack configuration control being displayed in first virtual scene; displaying a virtual backpack configuration page in response to the virtual backpack configuration control being selected, a configuration page management control being displayed in the virtual backpack configuration page; and displaying a configuration page management page in response to the configuration page management control being selected. Alternatively, the method includes: displaying a first virtual scene, at least one virtual interaction mode being displayed in the first virtual scene; displaying a grouping page in response to a target virtual interaction mode in the at least one virtual interaction mode being selected, a virtual backpack configuration control being displayed in the grouping page; displaying a virtual backpack configuration page in response to the virtual backpack configuration control being selected, a configuration page management control being displayed in the virtual backpack configuration page; displaying a configuration page management page in response to the configuration page management control being selected, at least one configuration option corresponding to the first object and shared controls respectively corresponding to configuration options being displayed in the configuration page management page; and using, in response to a shared control corresponding to any configuration option being selected, in other words, any configuration option being selected in the configuration page management page, a virtual backpack corresponding to the selected configuration option as the shared virtual backpack provided by the first object.

Figure 16:
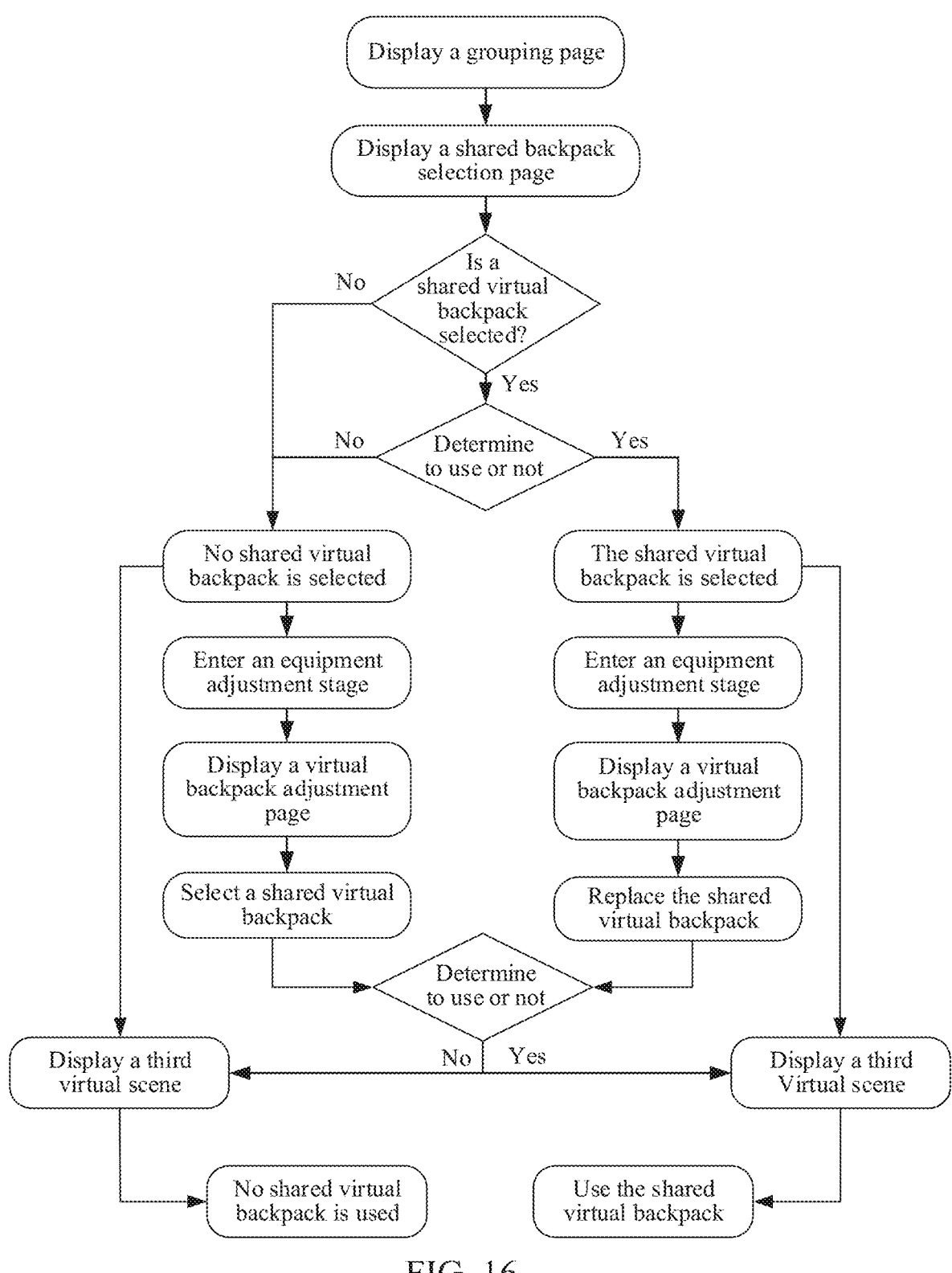
FIG. 16 is a flowchart of a virtual item sharing method according to an embodiment of this application.

FIG. 16 is a flowchart of a virtual item sharing method according to an embodiment of this application. FIG. 16 shows a process in which a first object selects a shared virtual backpack from shared virtual backpacks provided by a second object belonging to the same virtual camp as the first object, so that the first object can use a virtual item in the shared virtual backpack provided by the second object. The method includes:

displaying a grouping page, and displaying a shared backpack selection page based on completion of grouping of the first object, the virtual item in the shared virtual backpack provided by the second object that provides a shared virtual backpack being displayed in the shared backpack selection page;

entering an equipment adjustment stage if the first object selects a shared virtual backpack in the shared backpack selection page and determines to use the shared virtual backpack, and this means that the first object has selected the shared virtual backpack; and displaying a virtual backpack adjustment page, the first object replacing a shared virtual backpack with a new one based on the virtual backpack adjustment page and determining to use the new shared virtual backpack, and displaying a third virtual scene. The first object can use a virtual item in the shared virtual backpack replaced with.

If the first object selects a shared virtual backpack in the shared backpack selection page, the third virtual scene can be directly displayed, and the first object can use a virtual item in the selected shared virtual backpack.

If the first object does not select a shared virtual backpack in the shared backpack selection page, or the first object selects a shared virtual backpack in the shared backpack selection page but does not determine to use the shared virtual backpack, it means that the first object does not select a shared virtual backpack, then the equipment adjustment stage is entered. The virtual backpack adjustment page is displayed. The first object selects a shared virtual backpack based on the virtual backpack adjustment page and determines to use the shared virtual backpack. Then the third virtual scene is displayed. The first object can use a virtual item in the selected shared virtual backpack.

If the first object does not select a shared virtual backpack in the shared backpack selection page, or the first object selects a shared virtual backpack in the shared backpack selection page but does not determine to use the shared virtual backpack, it means that the first object does not select a shared virtual backpack, then the equipment adjustment stage is entered. The virtual backpack adjustment page is displayed. The first object selects a shared virtual backpack based on the virtual backpack adjustment page but does not determine to use the shared virtual backpack. Then the third virtual scene is displayed. The first object cannot use a virtual item in the selected shared virtual backpack.

If the first object does not select a shared virtual backpack in the shared backpack selection page, or the first object selects a shared virtual backpack in the shared backpack selection page but does not determine to use the shared virtual backpack, it means that the first object does not select the shared virtual backpack. In this case, the third virtual scene can be directly displayed, and the first object can only use a virtual item in a virtual backpack corresponding to a configuration option corresponding to the first object.

In some embodiments, this application further provides a virtual item sharing method. The method may include at least one of the following operations 1 to 3.

Operation 1: Display a grouping page corresponding to a target virtual interaction mode, a shared backpack control being displayed in the grouping page, the shared backpack control being used by a first object to select a shared virtual backpack from shared virtual backpacks provided by any third object, and the first object and the third object belonging to a same virtual camp.

Operation 2: Display a shared backpack selection page in response to the shared backpack control being selected, a shared virtual backpack provided by any third object and a virtual item in the shared virtual backpack provided by the third object being displayed in the shared backpack selection page.

Operation 3: Use, in response to a first shared virtual backpack being selected, a virtual item in the first shared virtual backpack as a virtual item shared and used by the first object, the first shared virtual backpack being any shared virtual backpack provided by any third object, and the first shared virtual backpack including a virtual item not owned by the first object.

Based on the foregoing method, the first object can select a shared virtual backpack while the grouping, thereby saving the time required to enter the game.

In some embodiments, the method further includes: displaying a virtual backpack adjustment page, the virtual item in the first shared virtual backpack and a virtual backpack replacement control being displayed in the virtual backpack adjustment page; displaying the shared backpack selection page in response to the virtual backpack replacement control being selected; and switching a virtual item of the first object from the virtual item in the first shared virtual backpack to a virtual item in a second shared virtual backpack in response to the second shared virtual backpack being selected, the second shared virtual backpack being any shared virtual backpack other than the first shared virtual backpack among the shared virtual backpacks provided by any third object. Based on the foregoing method, the first object can switch the selected shared virtual backpack, thereby increasing a fault tolerance rate of shared virtual backpack selection.

In some embodiments, a disabled virtual item in a shared virtual backpack provided by any third object is further displayed in the shared backpack selection page, and the disabled virtual item cannot be used by the first object. Disabled virtual items in shared virtual backpacks are displayed in the shared backpack selection page to facilitate selection of the first object.

In some embodiments, the method further includes: displaying a virtual backpack adjustment page, the virtual item in the first shared virtual backpack and a virtual item replacement control being displayed in the virtual backpack adjustment page; displaying a virtual item selection page in response to the first virtual item and the virtual item replacement control being selected, at least one virtual item being displayed in the virtual item selection page, and the first virtual item being any virtual item in the first shared virtual backpack; and switching the first virtual item to a second virtual item in response to the second virtual item being selected, the second virtual item being any virtual item displayed in the virtual item selection page. Based on the foregoing method, the first object can switch a virtual item that the first object does not want to use in the first shared virtual backpack to another virtual item, making selection for a virtual item more flexible.

In some embodiments, the method further includes: displaying a virtual backpack adjustment page, the virtual item in the first shared virtual backpack and a virtual item deletion control being displayed in the virtual backpack adjustment page; and deleting a third virtual item in response to the third virtual item and the virtual item deletion control being selected. Based on the foregoing method, the first object can delete a virtual item that the first object does not want to use in the first shared virtual backpack, making selection for a virtual item more flexible.

In some embodiments, the method further includes: displaying a virtual backpack adjustment page, the virtual item in the first shared virtual backpack and a virtual item adding control being displayed in the virtual backpack adjustment page; displaying a virtual item selection page in response to the virtual item adding control being selected, at least one virtual item being displayed in the virtual item selection page; and adding a fourth virtual item as a virtual item of the first object in response to the fourth virtual item being selected, the fourth virtual item being any virtual item displayed in the virtual item selection page. Based on the foregoing method, the first object can add a virtual item in another shared virtual backpack to the first shared virtual backpack, making selection for a virtual item more flexible.

In some embodiments, the method further includes: displaying a virtual backpack adjustment page, a target control being displayed in the virtual backpack adjustment page, and the target control being used by the first object to select a shared virtual backpack from the shared virtual backpacks provided by any third object; displaying the shared backpack selection page in response to the target control being selected; and using, in response to a fourth shared virtual backpack being selected, a virtual item in the fourth shared virtual backpack as the virtual item shared and used by the first object, the fourth shared virtual backpack being any shared virtual backpack provided by any third object. Based on the foregoing method, the first object can select a shared virtual backpack before entering a game to enhance game experience.

This embodiment and the foregoing embodiments belong to different directions of the same concept. For content not described in detail in this embodiment, reference may be made to the foregoing embodiments.

Figure 17:
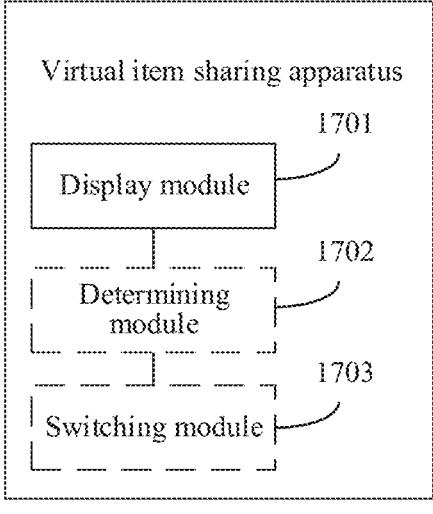
FIG. 17 is a schematic diagram of a structure of a virtual item sharing apparatus according to an embodiment of this application.

FIG. 17 is a schematic diagram of a structure of a virtual item sharing apparatus according to an embodiment of this application. As shown in FIG. 17, the apparatus includes:

a display module 1701, configured to display at least one configuration option corresponding to a first object and shared controls respectively corresponding to configuration options, one configuration option corresponding to at least one virtual backpack, and one virtual backpack including at least one virtual item, the display module 1701 being further configured to use, in response to a shared control corresponding to a target configuration option in the at least one configuration option being selected, at least one virtual backpack corresponding to the target configuration option as a shared virtual backpack provided by the first object, a virtual item in any shared virtual backpack provided by the first object being used by a second object belonging to a same virtual camp as the first object, and any shared virtual backpack provided by the first object including a virtual item not owned by the second object.

In a possible implementation, the display module 1701 is configured to: display a first virtual scene, a virtual backpack configuration control being displayed in first virtual scene; display a virtual backpack configuration page in response to the virtual backpack configuration control being selected, a configuration page management control being displayed in the virtual backpack configuration page; and display a configuration page management page in response to the configuration page management control being selected, at least one configuration option corresponding to the first object and shared controls respectively corresponding to configuration options being displayed in the configuration page management page.

In a possible implementation, the display module 1701 is configured to: display a second virtual scene, at least one virtual interaction mode being displayed in second virtual scene; display, in response to a target virtual interaction mode in the at least one virtual interaction mode being selected, a grouping page corresponding to the target virtual interaction mode, a virtual backpack configuration control being displayed in the grouping page; display a virtual backpack configuration page in response to the virtual backpack configuration control being selected, a configuration page management control being displayed in the virtual backpack configuration page; and display a configuration page management page in response to the configuration page management control being selected, at least one configuration option corresponding to the first object and shared controls respectively corresponding to configuration options being displayed in the configuration page management page.

In a possible implementation, a shared backpack control is further displayed in grouping page, and the shared backpack control is used by the first object to select a shared virtual backpack from shared virtual backpacks provided by any third object.

The display module 1701 is further configured to display a shared backpack selection page in response to the shared backpack control being selected, a shared virtual backpack provided by any third object and a virtual item in the shared virtual backpack provided by the third object being displayed in the shared backpack selection page.

The apparatus further includes:

a determining module 1702, configured to use, in response to a first shared virtual backpack being selected, a virtual item in the first shared virtual backpack as a virtual item shared and used by the first object, the first shared virtual backpack being any shared virtual backpack provided by any third object.

In a possible implementation, the display module 1701 is further configured to: display a virtual backpack adjustment page, the virtual item in the first shared virtual backpack and a virtual backpack replacement control being displayed in the virtual backpack adjustment page; and display a shared backpack selection page in response to the virtual backpack replacement control being selected. There is a disabled virtual item in a shared virtual backpack provided by any third object in the shared backpack selection page, and the disabled virtual item cannot be used.

The apparatus further includes:

a switching module 1703, configured to switch a virtual item of the first object from the virtual item in the first shared virtual backpack to a virtual item in a second shared virtual backpack in response to the second shared virtual backpack being selected, the second shared virtual backpack being any shared virtual backpack other than the first shared virtual backpack among the shared virtual backpacks provided by any third object.

In a possible implementation, the display module 1701 is further configured to: display a third virtual scene, a switching control being displayed in the third virtual scene, a virtual item used by the first object in the third virtual scene being a virtual item in a target shared virtual backpack, the target shared virtual backpack being any shared virtual backpack provided by any third object and selected by the first object, and the switching control being configured to switch the virtual item used by the first object; and display a virtual backpack switching page in response to the switching control being selected, the virtual item in the target shared virtual backpack and a virtual item in a virtual backpack corresponding to the first object being displayed in the virtual backpack switching page.

The switching module 1703 is further configured to switch the virtual item of the first object from the virtual item in the target shared virtual backpack to a virtual item in a third virtual backpack in response to the third virtual backpack being selected, the third virtual backpack being any one of virtual backpacks corresponding to the first object.

In a possible implementation, viewing controls respectively corresponding to configuration options are displayed in the configuration page management page.

The display module 1701 is further configured to display a first configuration page in response to a viewing control corresponding to a first configuration option being selected, at least one virtual backpack corresponding to the first configuration option and virtual items respectively included in virtual backpacks being displayed in the first configuration page.

In a possible implementation, usage controls respectively corresponding to the configuration options are displayed in the configuration page management page.

The determining module 1702 is further configured to use, in response to a usage control corresponding to a first configuration option being selected, any one of at least one virtual backpack corresponding to the first configuration option as a virtual backpack shared and used by the first object, the first object allowing use of a virtual item in any virtual backpack.

In a possible implementation, the display module 1701 is further configured to: display a virtual backpack adjustment page, a target control being displayed in the virtual backpack adjustment page, and the target control being used by the first object to select a shared virtual backpack from the shared virtual backpacks provided by any third object; and display the shared backpack selection page in response to the target control being selected.

The determining module 1702 is configured to use, in response to a fourth shared virtual backpack being selected, a virtual item in the fourth shared virtual backpack as the virtual item shared and used by the first object, the fourth shared virtual backpack being any shared virtual backpack provided by any third object.

In a possible implementation, a default configuration option corresponding to the first object, at least one virtual backpack corresponding to the default configuration option, and at least one virtual item in any virtual backpack corresponding to the default configuration option are further displayed in the virtual backpack configuration page.

In a possible implementation, the display module 1701 is configured to: display a game preparation page in response to the target virtual interaction mode in the at least one virtual interaction mode being selected, at least one virtual map and a start game control included in the target virtual interaction mode being displayed in the game preparation page; and display the grouping page in response to a target virtual map in the at least one virtual map being selected and the start game control being selected.

In the foregoing apparatus, the first object provides a shared virtual backpack to the second object belonging to the same virtual camp as the first object, so that the second object can use a virtual item in the shared virtual backpack. The second object only needs to belong to the same virtual camp as the first object, and is not limited to being an object that belongs to the same virtual camp as the first object and has a friend relationship with the first object, making sharing of the virtual item more flexible. Moreover, the virtual item in the virtual backpack provided by the first object to the second object includes an item not owned by the second object, so that the second object can experience, through the virtual item sharing manner, a virtual item that the second object is interested in but does not own, thereby diversifying a manner in which the second object obtains the virtual item, and improving interactive experience of the second object in virtual interaction.

Figure 18:
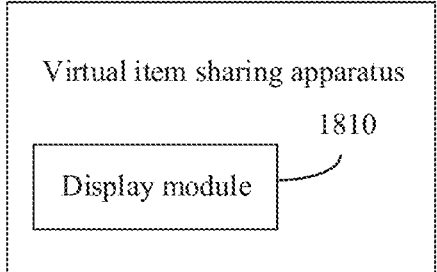
FIG. 18 is a schematic diagram of a structure of a virtual item sharing apparatus according to an embodiment of this application.

FIG. 18 is a schematic diagram of a structure of a virtual item sharing apparatus according to an embodiment of this application. As shown in FIG. 18, the apparatus includes:

a display module 1810, configured to display a grouping page corresponding to a target virtual interaction mode, a shared backpack control being displayed in the grouping page, the shared backpack control being used by a first object to select a shared virtual backpack from shared virtual backpacks provided by any third object, and the first object and the third object belonging to a same virtual camp, the display module 1810 being further configured to display a shared backpack selection page in response to the shared backpack control being selected, a shared virtual backpack provided by any third object and a virtual item in the shared virtual backpack provided by the third object being displayed in the shared backpack selection page, and the display module 1810 being further configured to use, in response to a first shared virtual backpack being selected, a virtual item in the first shared virtual backpack as a virtual item shared and used by the first object, the first shared virtual backpack being any shared virtual backpack provided by any third object, and the first shared virtual backpack in including a virtual item not owned by the first object.

In a possible implementation, the display module 1810 is further configured to: display a virtual backpack adjustment page, the virtual item in the first shared virtual backpack and a virtual backpack replacement control being displayed in the virtual backpack adjustment page; display the shared backpack selection page in response to the virtual backpack replacement control being selected; and switch a virtual item of the first object from the virtual item in the first shared virtual backpack to a virtual item in a second shared virtual backpack in response to the second shared virtual backpack being selected, the second shared virtual backpack being any shared virtual backpack other than the first shared virtual backpack among the shared virtual backpacks provided by any third object.

In a possible implementation, a disabled virtual item in a shared virtual backpack provided by any third object is further displayed in the shared backpack selection page, and the disabled virtual item cannot be used by the first object.

In a possible implementation, the display module 1810 is further configured to: display a virtual backpack adjustment page, the virtual item in the first shared virtual backpack and a virtual item replacement control being displayed in the virtual backpack adjustment page; display a virtual item selection page in response to the first virtual item and the virtual item replacement control being selected, at least one virtual item being displayed in the virtual item selection page, and the first virtual item being any virtual item in the first shared virtual backpack; and switch the first virtual item to a second virtual item in response to the second virtual item being selected, the second virtual item being any virtual item displayed in the virtual item selection page.

In a possible implementation, the display module 1810 is further configured to: display a virtual backpack adjustment page, the virtual item in the first shared virtual backpack and a virtual item deletion control being displayed in the virtual backpack adjustment page; and delete a third virtual item in response to the third virtual item and the virtual item deletion control being selected.

In a possible implementation, the display module 1810 is further configured to: display a virtual backpack adjustment page, the virtual item in the first shared virtual backpack and a virtual item adding control being displayed in the virtual backpack adjustment page; display a virtual item selection page in response to the virtual item adding control being selected, at least one virtual item being displayed in the virtual item selection page; and add a fourth virtual item as a virtual item of the first object in response to the fourth virtual item being selected, the fourth virtual item being any virtual item displayed in the virtual item selection page.

In a possible implementation, based on the first object not selecting the first shared virtual backpack in the shared backpack selection page, the display module 1810 is further configured to: display a virtual backpack adjustment page, a target control being displayed in the virtual backpack adjustment page, and the target control being used by the first object to select a shared virtual backpack from the shared virtual backpacks provided by any third object; display the shared backpack selection page in response to the target control being selected; and use, in response to a fourth shared virtual backpack being selected, a virtual item in the fourth shared virtual backpack as the virtual item shared and used by the first object, the fourth shared virtual backpack being any shared virtual backpack provided by any third object.

When the apparatus provided in the foregoing embodiment implements the functions of the apparatus, only division of the foregoing function modules is used as an example for description. In the practical application, the functions may be allocated to and completed by different function modules based on requirements. In other words, an internal structure of the device is divided into different function modules, to complete all or some of the functions described above. In addition, the apparatus provided in the foregoing embodiments and the method embodiments belong to the same concept. For details of the specific implementation process, reference may be made to the method embodiments. Details are not described herein again.

Figures 19, 20:
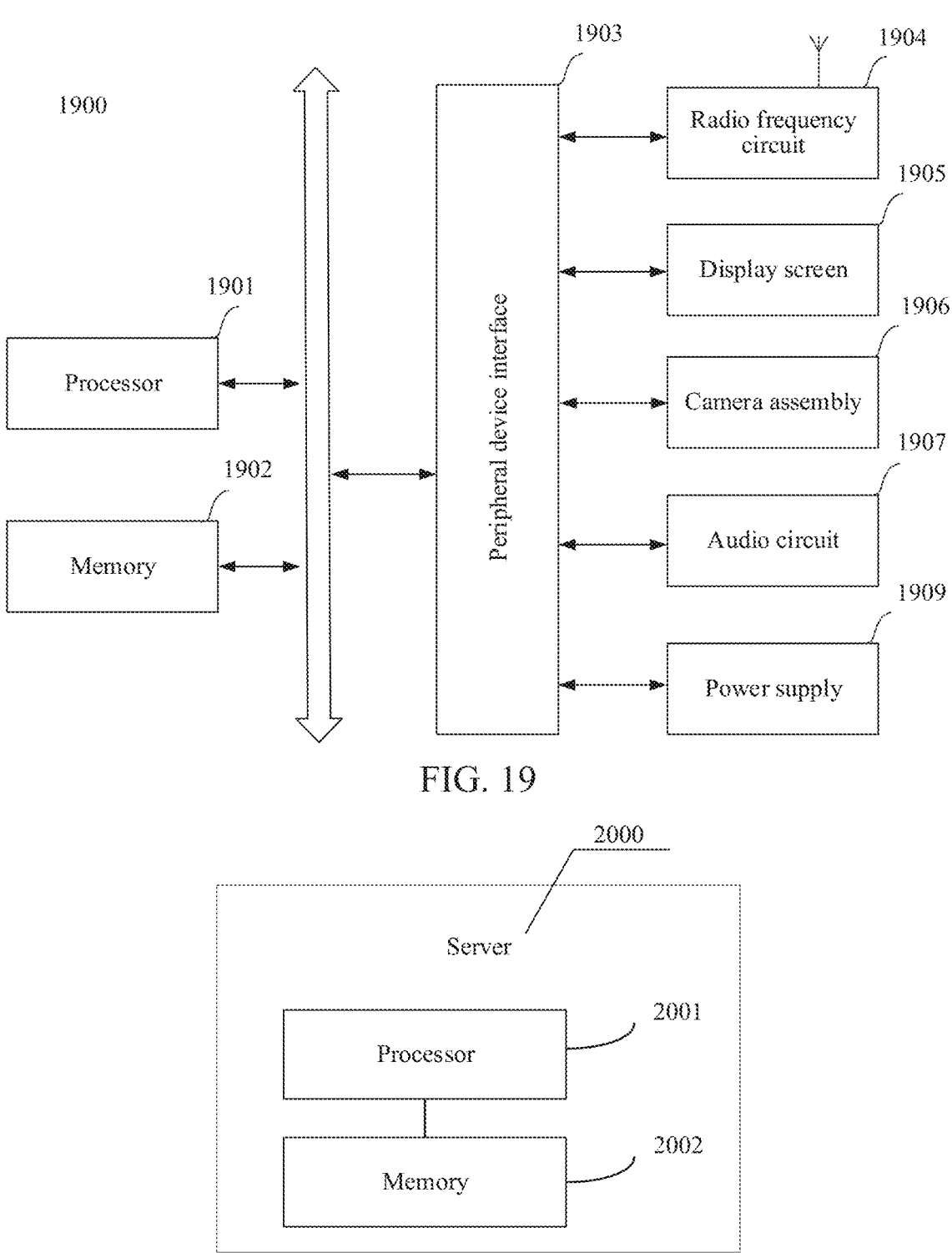
FIG. 19 is a schematic diagram of a structure of a terminal device according to an embodiment of this application.
FIG. 20 is a schematic diagram of a structure of a server according to an embodiment of this application.

FIG. 19 is a block diagram of a structure of a terminal device 1900 according to an exemplary embodiment of this application. The terminal device 1900 may be a portable mobile terminal, such as a smartphone, a tablet computer, a Moving Picture Experts Group Audio Layer III (MP3) player, a Moving Picture Experts Group Audio Layer IV (MP4) player, a notebook computer, or a desktop computer. The terminal device 1900 may also be referred to as another name such as user equipment, a portable terminal, a laptop terminal, or a desktop terminal.

Generally, the terminal device 1900 includes a processor 1901 and a memory 1902.

The processor 1901 may include one or more processing cores, for example, a 4-core processor or an 8-core processor. The processor 1901 may be implemented in at least one hardware form of a digital signal processor (DSP), a field-programmable gate array (FPGA), or a programmable logic array (PLA). The processor 1901 may also include a main processor and a coprocessor. The main processor is a processor configured to process data in an awake state, and is also referred to as a central processing unit (CPU). The coprocessor is a low-power processor configured to process data in a standby state. In some embodiments, the processor 1901 may be integrated with a graphics processing unit (GPU). The GPU is configured to render and draw content that needs to be displayed on a display screen. In some embodiments, the processor 1901 may further include an artificial intelligence (AI) processor. The AI processor is configured to process computing operations related to machine learning.

The memory 1902 may include one or more computer-readable storage media. The computer-readable storage medium may be non-transient. The memory 1902 may further include a high-speed random access memory and a nonvolatile memory, for example, one or more disk storage devices or flash storage devices. In some embodiments, the non-transitory computer-readable storage medium in the memory 1902 is configured to store at least one instruction, and the at least one instruction is configured to be executed by the processor 1901 to implement the virtual item sharing method provided in the method embodiments of this application.

In some embodiments, the terminal device 1900 may alternatively include a peripheral device interface 1903 and at least one peripheral device. The processor 1901, the memory 1902, and the peripheral device interface 1903 may be connected via a bus or a signal cable. Each peripheral device may be connected to the peripheral device interface 1903 via a bus, a signal cable, or a circuit board. Specifically, the peripheral device includes at least one of a radio frequency circuit 1904, a display screen 1905, a camera assembly 1906, an audio circuit 1907, or a power supply 1909.

A person skilled in the art may understand that the structure shown in FIG. 19 constitutes no limitation on the terminal device 1900, and the terminal device 1900 may include more or fewer components than those shown in the figure, or some components may be combined, or different component deployments may be used.

FIG. 20 is a schematic diagram of a structure of a server according to an embodiment of this application. The server 2000 may vary a lot due to different configurations or performance, and may include one or more central processing units (CPUs) 2001 and one or more memories 2002. The one or more memories 2002 stores at least one piece of program code, the at least one piece of program code is loaded and executed by the one or more central processing units 2001 to implement the virtual item sharing method provided in the foregoing method embodiments. Certainly, the server 2000 may further include components such as a wired or wireless network interface, a keyboard, and an input/output (I/O) interface, to facilitate input and output. The server 2000 may further include another component configured to implement a function of a device. Details are not described herein.

In an exemplary embodiment, a non-transitory computer-readable storage medium is further provided, having at least one piece of program code stored thereon. The at least one piece of program code is loaded and executed by a processor to cause a computer to implement any one of the foregoing virtual item sharing methods.

In one embodiment, the computer-readable storage medium may be a read-only memory (ROM), a random access memory (RAM), a compact disc random-only memory (CD-ROM), a magnetic tape, a floppy disk, an optical data storage device, and the like.

In an exemplary embodiment, a computer program or a computer program product is further provided, having at least one computer instruction stored thereon. The at least one computer instruction is loaded and executed by a processor to cause a computer to implement any one of the foregoing virtual item sharing methods.

Both the at least one piece of program code and at least one computer instruction mentioned above can be collectively referred to as a computer program.

Information (including but not limited to user equipment information, user personal information, and the like), data (including but not limited to data used for analysis, stored data, displayed data, and the like), and signals involved in this application are all authorized by users or fully authorized by all parties, and collection, use, and processing of related data need to comply with relevant laws, regulations, and standards of relevant countries and regions. For example, object information involved in this application are acquired under full authorization.

The term "a plurality of" mentioned in the specification means two or more. The term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects.

The sequence numbers of the foregoing embodiments of this application are merely for description purpose but do not imply the preference among the embodiments.

In sum, the term "module" in this application refers to a computer program or part of the computer program that has a predefined function and works together with other related parts to achieve a predefined goal and may be all or partially implemented by using software, hardware (e.g., processing circuitry and/or memory configured to perform the pre-defined functions), or a combination thereof. Each module can be implemented using one or more processors (or processors and memory). Likewise, a processor (or proces-sors and memory) can be used to implement one or more modules. Moreover, each module can be part of an overall module that includes the functionalities of the module. The foregoing descriptions are merely exemplary embodiments of this application, but are not intended to limit this appli-cation. Any modification, equivalent replacement, or improvement made within the principle of this application shall fall within the protection scope of this application.

What is claimed is:

1. A virtual item sharing method performed by a computer device, the method comprising:

displaying at least one configuration option corresponding to a first object and shared controls respectively corre-sponding to configuration options, each configuration option corresponding to at least one virtual backpack, and each virtual backpack comprising at least one virtual item;

in response to a selection of a shared control correspond-ing to a target configuration option in the at least one configuration option, setting at least one virtual back-pack corresponding to the target configuration option as a shared virtual backpack provided by the first object; and sharing a virtual item in any shared virtual backpack provided by the first object with a second object belonging to a same virtual camp as the first object, and each shared virtual backpack provided by the first object comprising a virtual item not owned by the second object.

2. The method according to claim 1, wherein the display-ing at least one configuration option corresponding to a first object and shared controls respectively corresponding to configuration options comprises:

displaying a first virtual scene including a virtual back-pack configuration control;

displaying a virtual backpack configuration page in response to the virtual backpack configuration control being selected, a configuration page management con-trol being displayed in the virtual backpack configura-tion page; and displaying a configuration page management page in response to a selection of the configuration page man-agement control, the at least one configuration option corresponding to the first object and the shared controls respectively corresponding to the configuration options being displayed in the configuration page management page.

3. The method according to claim 1, wherein the display-ing at least one configuration option corresponding to a first object and shared controls respectively corresponding to configuration options comprises:

displaying a second virtual scene, at least one virtual interaction mode being displayed in the second virtual scene;

displaying, in response to a target virtual interaction mode in the at least one virtual interaction mode being selected, a grouping page corresponding to the target virtual interaction mode, a virtual backpack configura-tion control being displayed in the grouping page;

displaying a virtual backpack configuration page in response to the virtual backpack configuration control being selected, a configuration page management con-trol being displayed in the virtual backpack configura-tion page; and displaying a configuration page management page in response to the configuration page management control being selected, the at least one configuration option corresponding to the first object and the shared controls respectively corresponding to the configuration options being displayed in the configuration page management page.

4. The method according to claim 3, wherein a shared backpack control is further displayed in the grouping page, and the shared backpack control is used by the first object to select a shared virtual backpack from shared virtual back-packs provided by any third object; and after the displaying, in response to a target virtual inter-action mode in the at least one virtual interaction mode being selected, a grouping page corresponding to the target virtual interaction mode, the method further comprises:

displaying a shared backpack selection page in response to the shared backpack control being selected, a shared virtual backpack provided by any third object and a virtual item in the shared virtual backpack provided by the third object being displayed in the shared backpack selection page; and using, in response to a first shared virtual backpack being selected, a virtual item in the first shared virtual back-pack as a virtual item shared and used by the first object, the first shared virtual backpack being any shared virtual backpack provided by any third object.

5. The method according to claim 4, wherein the sharing a virtual item in any shared virtual backpack provided by the first object with a second object belonging to a same virtual camp as the first object further comprises:

displaying a virtual backpack adjustment page including the virtual item in the first shared virtual backpack and a virtual backpack replacement control;

displaying the shared backpack selection page in response to a selection of the virtual backpack replacement control; and switching a virtual item of the first object from the virtual item in the first shared virtual backpack to a virtual item in a second shared virtual backpack in response to a selection of the second shared virtual backpack, the second shared virtual backpack being any shared vir-tual backpack other than the first shared virtual back-pack among the shared virtual backpacks provided by any third object.

6. The method according to claim 1, further comprising:

displaying a third virtual scene, a switching control being displayed in the third virtual scene, a virtual item used by the first object in the third virtual scene being a virtual item in a target shared virtual backpack, the target shared virtual backpack being any shared virtual backpack provided by any third object and selected by the first object, and the switching control being configured to switch the virtual item used by the first object;

displaying a virtual backpack switching page in response to the switching control being selected, the virtual item in the target shared virtual backpack and a virtual item in a virtual backpack corresponding to the first object being displayed in the virtual backpack switching page; and switching the virtual item of the first object from the virtual item in the target shared virtual backpack to a virtual item in a third virtual backpack in response to the third virtual backpack being selected, the third virtual backpack being any one of virtual backpacks corresponding to the first object.

7. The method according to claim 2, wherein viewing controls respectively corresponding to the configuration options are displayed in the configuration page management page, and the method further comprises:

displaying a first configuration page in response to a viewing control corresponding to a first configuration option being selected, at least one virtual backpack corresponding to the first configuration option and virtual items respectively comprised in virtual backpacks being displayed in the first configuration page.

8. The method according to claim 2, wherein usage controls respectively corresponding to the configuration options are displayed in the configuration page management page, and the method further comprises:

using, in response to a usage control corresponding to a selection of a first configuration option, any one of at least one virtual backpack corresponding to the first configuration option as a virtual backpack shared and used by the first object, the first object allowing use of a virtual item in any virtual backpack.

9. The method according to claim 2, wherein a default configuration option corresponding to the first object, at least one virtual backpack corresponding to the default configuration option, and at least one virtual item in any virtual backpack corresponding to the default configuration option are further displayed in the virtual backpack configuration page.

10. A computer device, comprising a processor and a memory, the memory having a computer program stored therein, and the computer program, when executed by the processor, causing the computer device to implement a virtual item sharing method including:

displaying at least one configuration option corresponding to a first object and shared controls respectively corresponding to configuration options, each configuration option corresponding to at least one virtual backpack, and each virtual backpack comprising at least one virtual item; and in response to a selection of a shared control corresponding to a target configuration option in the at least one configuration option, setting at least one virtual backpack corresponding to the target configuration option as a shared virtual backpack provided by the first object; and sharing a virtual item in any shared virtual backpack provided by the first object with a second object belonging to a same virtual camp as the first object, and each shared virtual backpack provided by the first object comprising a virtual item not owned by the second object.

11. The computer device according to claim 10, wherein the displaying at least one configuration option corresponding to a first object and shared controls respectively corresponding to configuration options comprises:

displaying a first virtual scene including a virtual backpack configuration control;

displaying a virtual backpack configuration page in response to the virtual backpack configuration control being selected, a configuration page management control being displayed in the virtual backpack configuration page; and displaying a configuration page management page in response to a selection of the configuration page management control, the at least one configuration option corresponding to the first object and the shared controls respectively corresponding to the configuration options being displayed in the configuration page management page.

12. The computer device according to claim 10, wherein the displaying at least one configuration option corresponding to a first object and shared controls respectively corresponding to configuration options comprises:

displaying a second virtual scene, at least one virtual interaction mode being displayed in the second virtual scene;

displaying, in response to a target virtual interaction mode in the at least one virtual interaction mode being selected, a grouping page corresponding to the target virtual interaction mode, a virtual backpack configuration control being displayed in the grouping page;

displaying a virtual backpack configuration page in response to the virtual backpack configuration control being selected, a configuration page management control being displayed in the virtual backpack configuration page; and displaying a configuration page management page in response to the configuration page management control being selected, the at least one configuration option corresponding to the first object and the shared controls respectively corresponding to the configuration options being displayed in the configuration page management page.

13. The computer device according to claim 12, wherein a shared backpack control is further displayed in the grouping page, and the shared backpack control is used by the first object to select a shared virtual backpack from shared virtual backpacks provided by any third object; and after the displaying, in response to a target virtual interaction mode in the at least one virtual interaction mode being selected, a grouping page corresponding to the target virtual interaction mode, the method further comprises:

displaying a shared backpack selection page in response to the shared backpack control being selected, a shared virtual backpack provided by any third object and a virtual item in the shared virtual backpack provided by the third object being displayed in the shared backpack selection page; and using, in response to a first shared virtual backpack being selected, a virtual item in the first shared virtual backpack as a virtual item shared and used by the first object, the first shared virtual backpack being any shared virtual backpack provided by any third object.

14. The computer device according to claim 13, wherein the sharing a virtual item in any shared virtual backpack provided by the first object with a second object belonging to a same virtual camp as the first object further comprises:

displaying a virtual backpack adjustment page including the virtual item in the first shared virtual backpack and a virtual backpack replacement control;

displaying the shared backpack selection page in response to a selection of the virtual backpack replacement control; and switching a virtual item of the first object from the virtual item in the first shared virtual backpack to a virtual item in a second shared virtual backpack in response to a selection of the second shared virtual backpack, the second shared virtual backpack being any shared virtual backpack other than the first shared virtual backpack among the shared virtual backpacks provided by any third object.

15. The computer device according to claim 10, wherein the method further comprises:

displaying a third virtual scene, a switching control being displayed in the third virtual scene, a virtual item used by the first object in the third virtual scene being a virtual item in a target shared virtual backpack, the target shared virtual backpack being any shared virtual backpack provided by any third object and selected by the first object, and the switching control being configured to switch the virtual item used by the first object;

displaying a virtual backpack switching page in response to the switching control being selected, the virtual item in the target shared virtual backpack and a virtual item in a virtual backpack corresponding to the first object being displayed in the virtual backpack switching page; and switching the virtual item of the first object from the virtual item in the target shared virtual backpack to a virtual item in a third virtual backpack in response to the third virtual backpack being selected, the third virtual backpack being any one of virtual backpacks corresponding to the first object.

16. The computer device according to claim 11, wherein viewing controls respectively corresponding to the configuration options are displayed in the configuration page management page, and the method further comprises:

displaying a first configuration page in response to a viewing control corresponding to a first configuration option being selected, at least one virtual backpack corresponding to the first configuration option and virtual items respectively comprised in virtual backpacks being displayed in the first configuration page.

17. The computer device according to claim 11, wherein usage controls respectively corresponding to the configuration options are displayed in the configuration page management page, and the method further comprises:

using, in response to a usage control corresponding to a selection of a first configuration option, any one of at least one virtual backpack corresponding to the first configuration option as a virtual backpack shared and used by the first object, the first object allowing use of a virtual item in any virtual backpack.

18. The computer device according to claim 11, wherein a default configuration option corresponding to the first object, at least one virtual backpack corresponding to the default configuration option, and at least one virtual item in any virtual backpack corresponding to the default configuration option are further displayed in the virtual backpack configuration page.

19. A non-transitory computer-readable storage medium, having a computer program stored thereon, the computer program, when executed by a processor of a computer device, causing the computer device to implement a virtual item sharing method including:

displaying at least one configuration option corresponding to a first object and shared controls respectively corresponding to configuration options, each configuration option corresponding to at least one virtual backpack, and each virtual backpack comprising at least one virtual item; and in response to a selection of a shared control corresponding to a target configuration option in the at least one configuration option, setting at least one virtual backpack corresponding to the target configuration option as a shared virtual backpack provided by the first object; and sharing a virtual item in any shared virtual backpack provided by the first object with a second object belonging to a same virtual camp as the first object, and each shared virtual backpack provided by the first object comprising a virtual item not owned by the second object.

20. The non-transitory computer-readable storage medium according to claim 19, wherein the displaying at least one configuration option corresponding to a first object and shared controls respectively corresponding to configuration options comprises:

displaying a first virtual scene including a virtual backpack configuration control;

displaying a virtual backpack configuration page in response to the virtual backpack configuration control being selected, a configuration page management control being displayed in the virtual backpack configuration page; and displaying a configuration page management page in response to a selection of the configuration page management control, the at least one configuration option corresponding to the first object and the shared controls respectively corresponding to the configuration options being displayed in the configuration page management page.

* * * * *